(12) United States Patent
Takeuchi et al.

(10) Patent No.: US 6,564,014 B1
(45) Date of Patent: May 13, 2003

(54) FLASH CONTROL DEVICE

(75) Inventors: Hiroshi Takeuchi, Kawasaki (JP); Hiroyuki Iwasaki, Yokohama (JP)

(73) Assignee: Nikon Corporation, Tokyo (JP)

( * ) Notice: Subject to any disclaimer, the term of this patent is extended or adjusted under 35 U.S.C. 154(b) by 0 days.

(21) Appl. No.: 09/667,809

(22) Filed: Sep. 22, 2000

(30) Foreign Application Priority Data

Sep. 24, 1999 (JP) ............................................. 11-270730
Sep. 27, 1999 (JP) ............................................. 11-271629

(51) Int. Cl.[7] .............................. G03B 15/03; G03B 7/08
(52) U.S. Cl. ....................................... 396/157; 396/233
(58) Field of Search .......................... 396/61, 157, 158, 396/159, 162, 273, 233, 234

(56) References Cited

U.S. PATENT DOCUMENTS

| | | | | |
|---|---|---|---|---|
| 5,172,157 A | * | 12/1992 | Takagi | 396/157 |
| 5,400,112 A | * | 3/1995 | Takagi | 396/157 |
| 5,504,553 A | * | 4/1996 | Takagi | 396/157 |
| 5,541,706 A | * | 7/1996 | Goto | 396/231 |
| 5,652,929 A | * | 7/1997 | Yasukawa | 396/157 |

FOREIGN PATENT DOCUMENTS

| | | |
|---|---|---|
| JP | 3-68928 | 3/1991 |
| JP | 9-61913 | 3/1997 |

* cited by examiner

Primary Examiner—Alan A. Mathews
Assistant Examiner—Arthur A Smith
(74) Attorney, Agent, or Firm—Oliff & Berridge, PLC

(57) ABSTRACT

A flash control device includes: a flash emission section that performs main light emission at photography and preliminary light emission before photography; a flash photometric section that divides reflected light from a photographic subject due to the preliminary light emission into a plurality of photometric areas and performs photometry thereupon; and a flash control section that performs control by, if an output from at least one photometric area of the plurality of photometric areas is outside a predetermined range, resetting a gain related to photometry for the at least one photometric area, and performing again a preliminary light emission by the flash emission section and a preliminary light emission photometry by the flash photometric section.

22 Claims, 24 Drawing Sheets

SHUTTER SURFACE

SHUTTER SURFACE

FLASH CONTROL DEVICE

INCORPORATION BY REFERENCE

The disclosures of the following priority applications are herein incorporated by reference:

Japanese Patent Application No. 11-270730 filed Sep. 24, 1999;

Japanese Patent Application No. 11-271626 filed Sep. 27, 1999.

BACKGROUND OF THE INVENTION

1. Field of the Invention

The present invention relates to a flash control device which suitably controls a flash emission amount.

2. Description of the Related Art

With regard to a method for controlling a flash emission device (a strobe) of a single lens reflex camera, in the prior art, a flash control device which controls a flash emission amount has usually been of the TTL flash control type. Further, a type is known in which preliminary light emission is performed before the main light emission during photography and photometry is performed upon the light reflected back from the photographic subject, so as to obtain information for the main light emission.

For example, Japanese Laid-Open Patent Publication No. H3-68928 discloses an automatic light adjustment device which performs photometry by subdividing the light reflected from the photographic subject during preliminary light emission, derives the reflection ratio distribution of the photographic subject based upon this result, and there by obtains information for the main light emission.

Further, there is also a device which determines the light emission amount which is required during the main light emission based upon the results of photometry during the preliminary light emission, and which causes the flash emission section to perform the main light emission using this required emission amount as a target.

However, with the above described prior art flash control device, it sometimes happens that the amount of reflected light during the preliminary light emission falls outside the range over which the flash photometric section can perform photometry because it is too small or is too large, so that the photometric value which is obtained is not sufficiently reliable.

In particular, in the method in which the emission amount for the main light emission at the time of photography is determined in advance based upon the photometric output during the preliminary light emission, it sometimes happens that sufficient exposure accuracy cannot be obtained because the photometric accuracy at the time of the preliminary light emission directly affects the light emission accuracy during the main light emission.

Further, there is a case in which the photometry for the preliminary light emission is performed with TTL on the side of the camera, the direct photometry is performed on the side of the flash unit (the flash device or the strobe unit), and the main emission amount is calculated,at the flash unit based upon the value indicated from the camera and the value of the direct photometry in the flash unit. In this case, since on the side of the camera the photometry is not performed on the beginning of the preliminary light emission to be regarded as warming up of an emission tube, it can happen that the preliminary emission amount which is measured within the camera and the preliminary emission amount which is measured within the flash unit come to differ. In such a case the problem arises that it becomes impossible to calculate an accurate main emission amount for the value indicated from the camera.

SUMMARY OF THE INVENTION

The objective of the present invention is to propose a flash control device which can enhance the accuracy of exposure during flash photography by ensuring the photometric accuracy during preliminary light emission, even when the amount of light reflected during preliminary light emission is too small or is too large, and which as a result thereof can accurately calculate the main light emission amount.

Further, the present invention proposes a flash control device which can accurately calculate the main light emission amount, also in the case that the main light emission amount is calculated based upon photometric results for preliminary light emission both on the camera side and also on the flash unit side.

In order to attain the above objective, a flash control device according to the present invention comprises: a flash emission section that performs main light emission at photography and preliminary light emission before photography; a flash photometric section on that divides a photographic field into a plurality of photometric areas and performs photometry of reflected light from a photographic subject due to the preliminary light emission; and a flash control section that performs control by, if an output from at least one photometric area of the plurality of photometric areas is outside a predetermined range, resetting a gain related to photometry for the at least one photometric area, and performing again a preliminary light emission by the flash emission section and a preliminary light emission photometry by the flash photometric section.

Another flash control device according to the present invention comprises: a flash emission section that performs main light emission at photography and preliminary light emission before photography; a flash photometric section that divides a photographic field into a plurality of photometric areas and performs photometry of reflected light from a photographic subject due to the preliminary light emission; and a flash control section that performs control by, if an output from at least one photometric area of the plurality of photometric areas is outside a predetermined range, replacing the output from the at least one photometric area by a predetermined value that is set in advance.

Another flash control device according to the present invention comprises: a flash emission section that performs main light emission at photography and preliminary light emission before photography; a flash photometric section that divides a photographic field into a plurality of photometric areas and performs photometry of reflected light from a photographic subject due to the preliminary light emission; a main light emission amount calculation section that performs calculation for controlling the main light emission based upon an output of the flash photometric section; and a flash control section that performs control by, if the output from at least one photometric area of the plurality of photometric areas is outside a predetermined range, ensuring that the output from at least one photometric area is not used for calculation by the main light emission amount calculation section.

Another flash control device according to the present invention comprises: a flash emission section that performs main light emission at photography and preliminary light emission before photography; a flash photometric section that divides a photographic field into a plurality of photometric areas and performs photometry of reflected light from a photographic subject due to the preliminary light emission; a valid area determination section that determines one or more photometric areas to be used for main light emission control based upon an output of the flash photometric section; and a flash control section that performs control by, if outputs from the photometric areas of the flash photometric section that have been determined as valid by the valid area determination section are outside predetermined ranges, performing again a preliminary light emission by the flash emission section and a preliminary light emission photometry by the flash photometric section.

Another flash control device according to the present invention comprises: an ambient light photometric section that divides a photographic field into a plurality of ambient light photometric areas and performs photometry of light intensity of the photographic field due to ambient light; a flash emission section that performs main light emission at photography and preliminary light emission before photography; a flash photometric section that divides a photographic field into a plurality of photometric areas and performs photometry of reflected light from a photographic subject due to the preliminary light emission; and a flash control section that performs control by setting a gain of a flash photometric area of the flash photometric section that corresponds to at least one ambient light photometric area based upon a measured ambient light intensity of the at least one ambient light photometric area of the ambient light photometric section, and then by performing preliminary light emission photometry.

In this flash control device, it is preferred that the flash control section sets the gain of the flash photometric area of the flash photometric section that corresponds to the at least one ambient light photometric area small when the measured ambient light intensity in the at least one ambient light photometric area is great.

Another flash control device according to the present invention comprises: a flash emission section that performs preliminary light emission and main light emission; a flash control section that controls the flash emission section to perform the preliminary light emission and the main light emission; a flash photometric section that performs photometry upon light reflected from a photographic subject during the preliminary light emission; an indication value calculation section that calculates a main light emission amount indication value for calculating a main light emission amount in the flash emission section, based upon an output of the flash photometric section; and a specified information setting section that sets specified information related to a reference emission amount for calculating the main light emission amount in the flash emission section.

In this flash control device, it is preferred that the flash emission section repeats a small light emission of a predetermined emission amount during preliminary light emission. In this case, it is preferred that the specified information setting section, as the specified information related to the reference emission amount, sets a number of invalid small light emissions among small light emissions performed during the preliminary light emission. Furthermore, it is preferred that the specified information setting section sets as invalid a first through a predetermined number of small light emission among small light emissions performed during the preliminary light emission.

Also, it is preferred that the flash control section causes the flash emission section to perform again preliminary light emission when the flash photometric section has failed in preliminary light emission photometry. In this case, it is preferred that the specified information setting section, if preliminary light emission has been performed again, sets small light emissions from a first to end of the first preliminary light emission as invalid.

Also, it is preferred that the specified information setting section sets information showing invalid emission amount during preliminary light emission and information to relate valid preliminary emission amount and main light emission amount.

Also, it is preferred that: the flash emission section is attached to an outside of a main body of the device; a transmission section that transmits the indication value calculated by the indication value calculation section and the specified information set by the specified information setting section to the flash emission section, is further provided; and the flash emission section performs a different type of light emission control that is specified in advance, if the transmission section has failed to transmit information. In this case, it is preferred that the flash emission section performs control according to an external flash light control method, if the main light emission amount cannot be calculated.

Also, it is preferred that the flash emission section performs a different type of light emission control that is specified in advance, when no information has come from the transmission section during a predetermined time period from after an end of preliminary light emission, or when a command arrives for a start of main light emission before information has come from the transmission section. In this case, it is preferred that the flash emission section performs control according to an external flash light control method, if the main light emission amount cannot be calculated.

In the above flash control devices, it is preferred that the flash photometric section performs TTL flash control.

It is preferred that the above flash control devices are used in an electronic still camera that employs an image-capturing element.

Another flash control device according to the present invention comprises: a flash emission section that performs preliminary light emission and main light emission; a first flash photometric section that performs photometry upon light reflected from a photographic subject through a photographic lens of a camera during preliminary light emission; a second flash photometric section that performs photometry directly upon light from the flash emission section during preliminary light emission and during main light emission; a preliminary light emission control section that performs control of preliminary light emission based upon an output of the first flash photometric section; an invalid light emission information generation section that detects invalid light emission during preliminary light emission, and generates information related to the invalid light emission; a main light emission amount indication value calculation section that calculates a main light emission amount indication value for calculating a main light emission amount in the flash emission section, based upon an output of the first flash photometric section obtained excluding the invalid light emission during preliminary light emission; and a main light emission control section that calculates a main light emission amount based upon the main light emission amount indication value, the information related to invalid light emission, and an output of the second flash photometric section obtained during preliminary light emission, and that performs control of main light emission based upon the calculated main light emission amount and an output of the second flash photometric section.

A flash control device in a camera, according to the present invention, comprises: a flash direction section that directs a flash device connected to the camera to perform preliminary light emission and main light emission; a flash photometric section that performs photometry upon light reflected from a photographic subject through a photographic lens of the camera during preliminary light emission; a preliminary light emission control section that performs control of preliminary light emission based upon an output of the flash photometric section; an invalid light emission information generation section that detects invalid light emission during preliminary light emission, and generates information related to the invalid light emission; a indication value calculation section that calculates a main light emission amount indication value for calculating a main light emission amount in the flash device, based upon an output of the flash photometric section obtained excluding the invalid light emission during preliminary light emission; and a main light emission information output section that outputs the main light emission amount indication value and the information related to invalid light emission to the flash device, in order that a main light emission amount can be calculated in the flash device based upon the main light emission on amount indication value, the information related to invalid light emission, and an absolute preliminary light emission amount that was obtained through photometry directly upon light from a flash emission section in the flash device during preliminary light emission.

A flash device connected to a camera, according to the present invention, comprises: a flash emission section that performs preliminary light emission and main light emission based upon a direction from the camera; a flash photometric section that performs photometry directly upon light from the flash emission section during preliminary light emission and during main light emission; a main light emission information input section that inputs, from the camera, information related to invalid light emission during preliminary light emission and a main light emission amount indication value that is calculated based on photometry upon light reflected from a photographic subject through a photographic lens of the camera excluding the invalid light emission during preliminary light emission; a main light emission amount calculation section that calculates a main light emission amount based upon the main light emission amount indication value input by the main light emission information input section, the information related to invalid light emission input by the main light emission information input section, and an absolute preliminary light emission amount that was obtained through photometry by the flash photometric section flash during preliminary light emission; and a main light emission control section that controls a main light emission based upon the main light emission amount calculated by the main light emission amount calculation section and an output of the flash photometric section.

DESCRIPTION OF THE PREFERRED EMBODIMENTS

Embodiment 1

Figure 1:
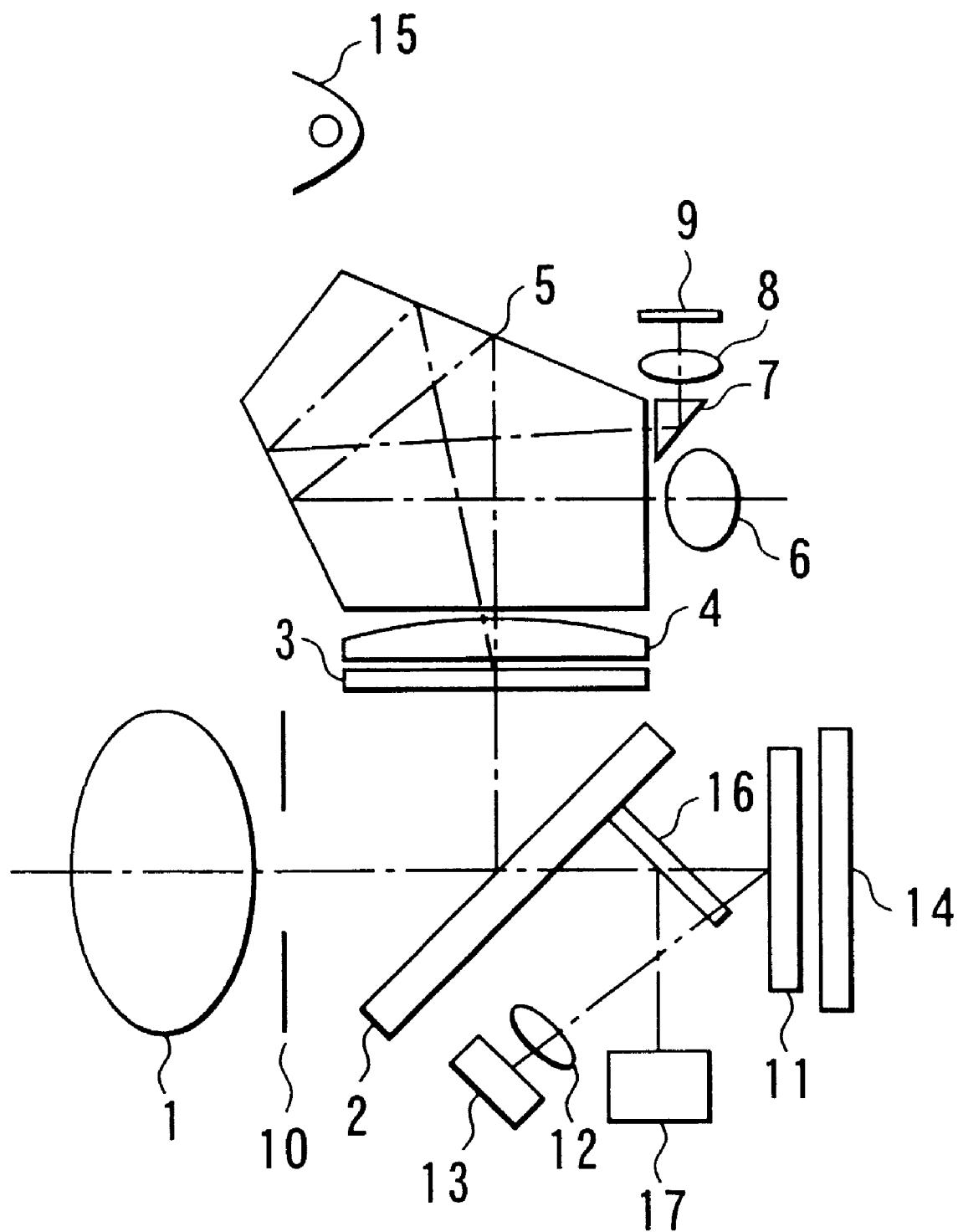
FIG. 1 is a schematic figure showing the optical system of a first embodiment of the flash control device according to the present invention.

FIG. 1 is a figure showing the optical system of a first preferred embodiment of the flash control device for a camera according to the present invention. A ray bundle which has passed through a photographic lens 1 is deflected by a quick return mirror 2 and is temporarily focused into an image upon a diffusion screen 3. Thereafter it reaches the eye of the photographer via a condenser lens 4, a pentaprism 5, and an eyepiece lens 6.

On the other hand, a portion of this ray bundle which has been diffused by the diffusion screen 3 is refocused into an image upon an ambient light (non-flash light) photometric element 9 via the condenser lens 4, the pentaprism 5, a prism for photometry 7, and a lens for photometry 8.

Figure 3:
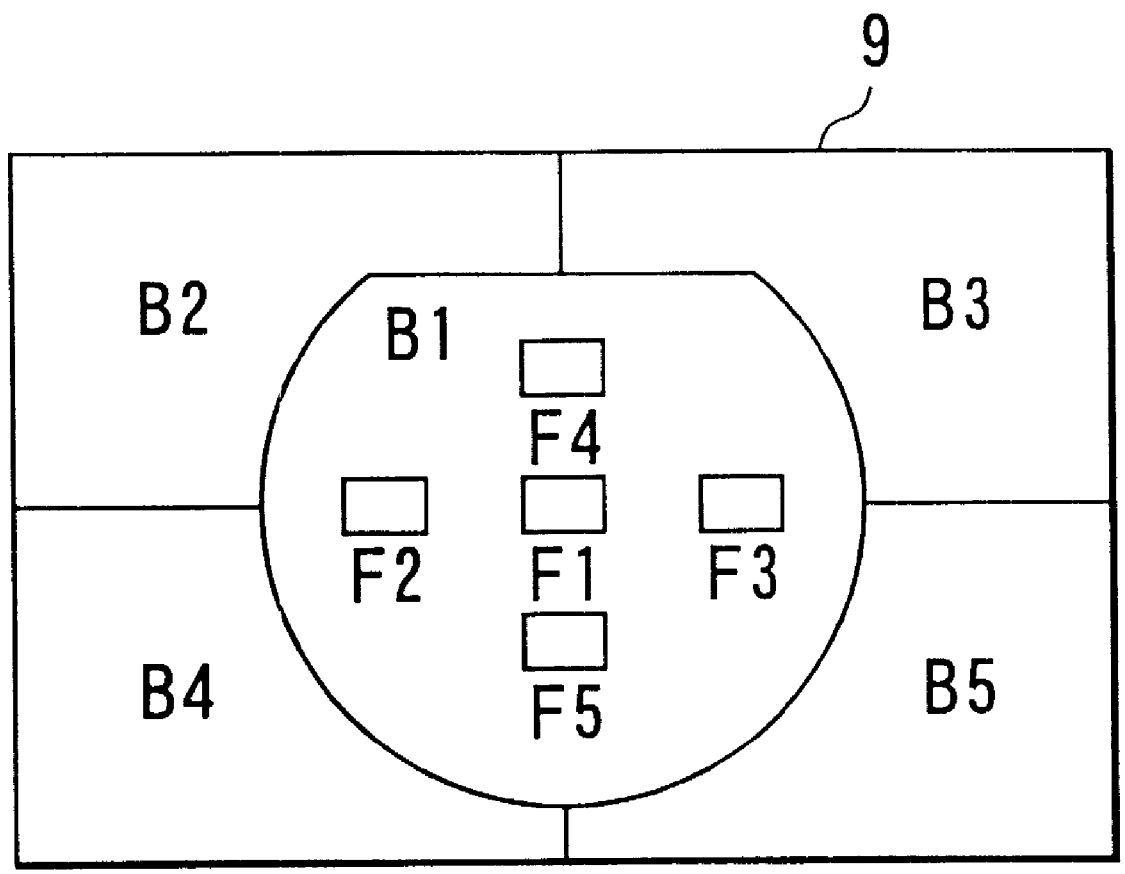
FIG. 3 is a figure showing a pattern of division of a photometric element 9 of this flash control device according to the first embodiment, as compared to the photographic field.

A light receiving element such as, for example, an SPD (a silicon photodiode) or the like may be used as the ambient light photometric element 9, and as shown in FIG. 3 it is constructed so as to be able to perform photometry by dividing the photographic field into five regions B1 through B5 and by outputting a light value for each of these regions.

When photography is to be performed, first the quick return mirror 2 is raised out of the way, at the same time as an aperture 10 is set to a predetermined value. After this, at the time of preliminary light emission by a flash emission device 15, a partial ray bundle which has been roughly focused into an image upon a shutter 11 and has been reflected is refocused via a lens 12 for light adjustment into an image upon a light adjustment element 13. At the time of main light emission by the flash emission device 15, the shutter 11 is opened, and the ray bundle is focused into an image upon the light receiving surface of an image-capturing element 14, which may consist of, for example, a CCD (charge coupled device) or the like.

Figure 4:
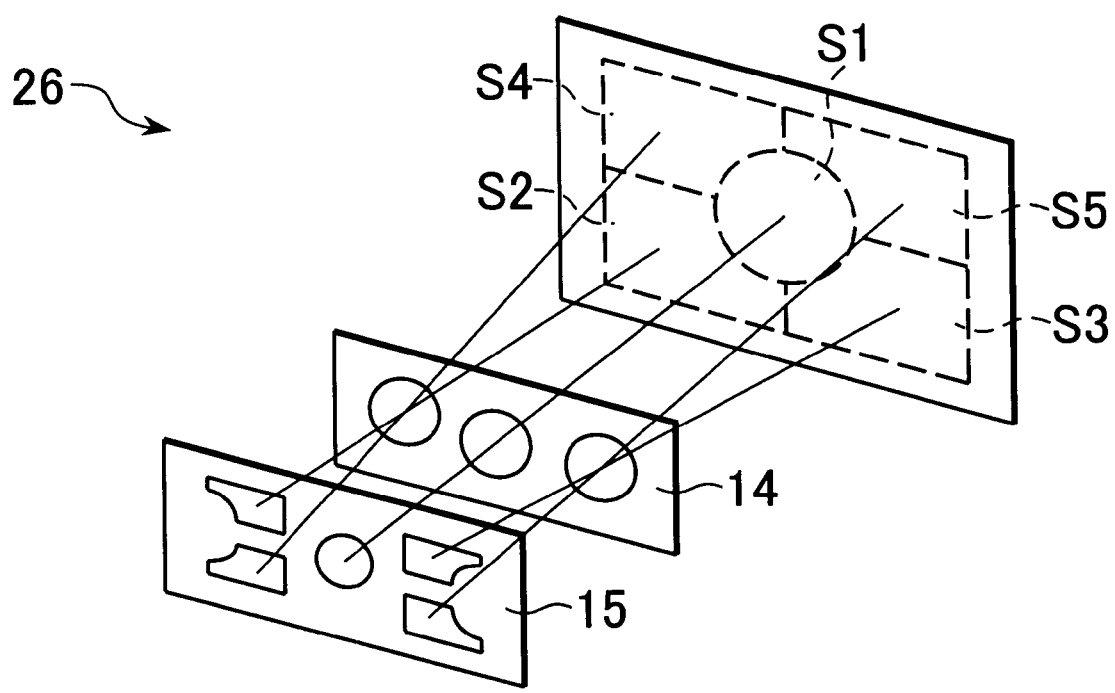
FIG. 4 is a figure showing an optical system and a pattern of division of the photometric region of a flash photometric section 26 of this flash control device according to the first embodiment.

The light adjustment element 13 comprises an SPD, a capacitor which accumulates the electrical current from the SPD, an amplifier and the like, and, as shown in FIG. 4, it is divided up in a pattern roughly the same as that of the ambient light photometric element 9, with regions S1 through S5 which respectively correspond to the regions B1 through B5 in FIG. 3.

Further, the quick return mirror 2 is constituted as a half mirror which passes a portion of the light incident upon it, and a portion of the ray bundle which has passed through it is reflected downwards by a sub-mirror 16 and is conducted to a focus detection section 17.

The focus detection section 17 detects the focal condition for any of the central regions F1 through F5 of the photographic field shown in FIG. 3, and drives the photographic lens 1 until the properly focused condition is attained.

Figure 2:
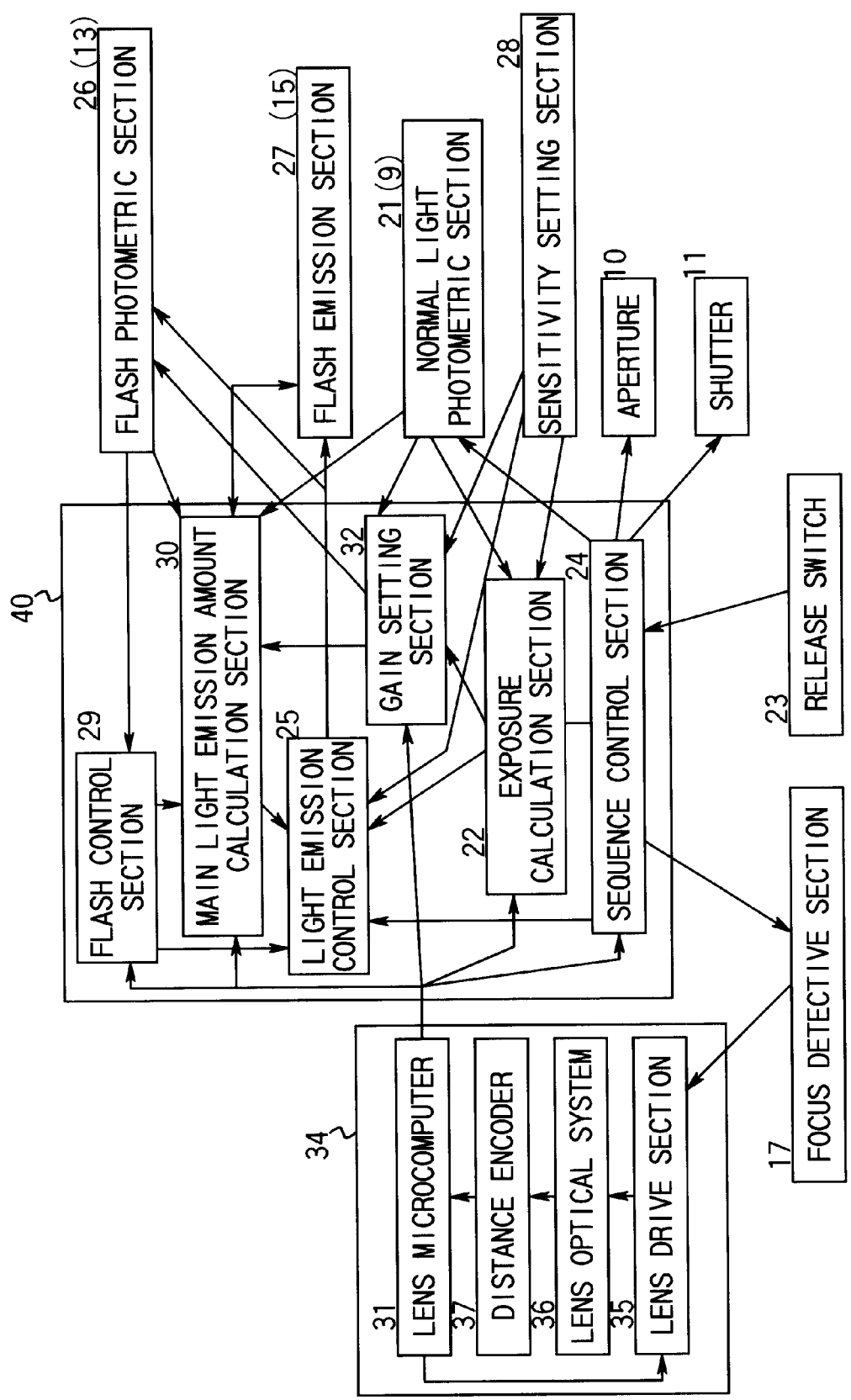
FIG. 2 is a block diagram showing the signal flow in this flash control device according to the first embodiment.

FIG. 2 is a block diagram showing the overall construction of the flash control device according to the first embodiment.

An ambient light photometric section 21 is a section which performs ambient light photometry by dividing up the photographic field into five portions as shown in FIG. 3. A flash emission section 27, which corresponds to the flash emission device 15 of FIG. 1, is an element which performs main light emission at the time of photography and preliminary light emission before photography. A sensitivity setting section 28 is an element which sets sensitivity information of the image-capturing element 14.

An exposure calculation section 22 is a calculation section which calculates an appropriate exposure value related to ambient light exposure based upon the output from the ambient light photometric section 21, lens information such as the open aperture F value of the photographic lens, the focal distance, the exit pupil position and the like stored in a lens microcomputer 31 which is a microprocessor provided in the photographic lens, and sensitivity information for the image-capturing element 14 from the sensitivity setting section 28; and it separates the result of calculation into an aperture value and a shutter value, which it then outputs to a sequence control section 24 etc.

The sequence control section 24 is a section which, when it inputs a release signal from a release switch 23, performs sequential operation control by, after raising up the quick return mirror 2 and closing the aperture 10 to a predetermined value, sending a preliminary light emission command to a light emission control section 25, and then, simultaneously with controlling the shutter 11, again sending a main light emission command to the light emission control section 25, etc.

The light emission control section 25 is a section which controls a flash photometric section 26, the flash emission section 27 and the like based upon signals from the exposure calculation section 22, the sequence control section 24, a flash control section 29, the sensitivity setting section 28, and the like.

The flash control section 29 is a section which inputs a preliminary light emission integrated value from the flash photometric section 26 and decides whether or not this output from the flash photometric section 26 is outside a predetermined range, and which makes a gain setting section 32 reset the gain for the photometric area of the flash photometric section 26 the output of which is outside the predetermined range, and also controls again to perform preliminary light emission by the flash emission section 27 and preliminary light emission photometry by the flash photometric section 26.

A main light emission calculation section 30 is a section which calculates a main light emission amount based upon preliminary light emission integrated values from the flash photometric section 26, photometric values from the ambient light photometric section 21, a photographic distance from the lens microcomputer 31, a preliminary light emission guide number from the flash emission section 27, an aperture opening value from the exposure calculation section 22, a sensitivity value from the sensitivity setting section 28, and the like; and it outputs this calculated main light emission amount value to the light emission control section 27.

The gain setting section 32 is a section which calculates amplification gains for the flash photometric section 26 and which performs gain setting for the flash photometric section 26.

It should be understood that the operations of the exposure calculation section 22, the main light emission amount calculation section 30, the flash control section 29, the light emission control section 25, the gain setting section 32, and the sequence control section 24 are implemented by internal calculations within a one-chip microprocessor 40 (hereinafter abbreviated as "microcomputer").

An interchangeable lens 34 comprises a lens drive section 35 which performs drives control based upon the signals from the focus detection section 17 and the lens microcomputer 31, a lens optical system 36 which is driven by the lens drive section 35, a distance encoder 37 which detects the amount of displacement of the lens optical system 36, the lens microcomputer 31 which stores lens information for the lens optical system 36 such as the open aperture F value, the focal distance, the exit pupil position, etc., and performs control within the lens, and the like.

The flash photometric section 26 is a section which divides up the photographic field and performs photometry upon the light from the preliminary light emission reflected back from the photographic subject, and it includes the previously mentioned accumulation type photometric element 13. This flash photometric section 26 multiplies the photoelectric currents generated by the SPD by a different amplification gain for each area, and accumulates the amplified results in capacitors for integration. Upon read-out, the electric charge accumulated in the capacitor corresponding to each area is read out as a voltage value. Due to this, if the gains are set to appropriate values corresponding to the amounts of light which are incident, it is possible to prevent the accumulated amounts becoming saturated or becoming too small, and it is thereby possible to increase the dynamic range of the flash photometric section 26

The above described ambient light photometric section 21 measures the ambient light intensity of the area divided up into five portions in a pattern roughly the same as the division pattern of the flash photometric section 26. For an area in which this ambient light intensity is high, it is forecast that a large amount of light will also be incident upon the flash photometric section 26 during the preliminary light emission photometry which is performed subsequently.

The preliminary light emission photometry is performed in two steps. First, initially, flash light emission is performed, and photometry is performed upon the light from this preliminary light emission reflected back from the photographic subject, and at this time, while accumulation of this preliminary light emission is performed, a proportion of ambient light is also included in the light entering the flash photometric section 26. After this, photometry is performed by this same flash photometric section 26 with the same gain and the same accumulation time period without performing any flash light emission, so that accumulation of the ambient light only is performed. The values obtained by subtracting the accumulated values of the ambient light from the accumulated values of preliminary light emission are taken as the net accumulated values of preliminary light emission. Due to this, however, the accumulated values of preliminary light emission may undesirably become saturated if the intensity of the ambient light is high, and in this case it becomes impossible to measure the preliminary light emission accurately.

In this connection, it is possible to avoid saturation of the output of the flash photometric section 26 by setting the amplification gains of the flash photometric section 26 low for areas where the intensity of the ambient light is high, and in this case photometry of the preliminary light emission can be accurately performed.

FIG. 3 is a figure showing the pattern of division of the photometric element 9 in comparison with the photographic field.

The photometric element 9 is constituted so as to be able to perform photometry over substantially the whole surface of the photographic field by dividing it into five portions, and by outputting five corresponding photometric values B1 through B5.

FIG. 4 is a figure showing the optical system of the flash photometric section 26 and the division pattern of the photometric region.

The optical system of the flash photometric section 26 is constituted so as to refocus the image of the photographic subject which is incident and focused into an image upon the shutter surface by a triple lens for light adjustment 12 into an image upon the light adjustment element 13, and so as to accumulate the respective electric charges which have been photoelectrically converted by each of the five regions Si through S5 into which it is divided. Here, the relationship between each of the regions S1 through S5 and its serial number corresponds to that between each of the photometric regions B1 through B5 in FIG. 3 and its serial number.

Figure 5:
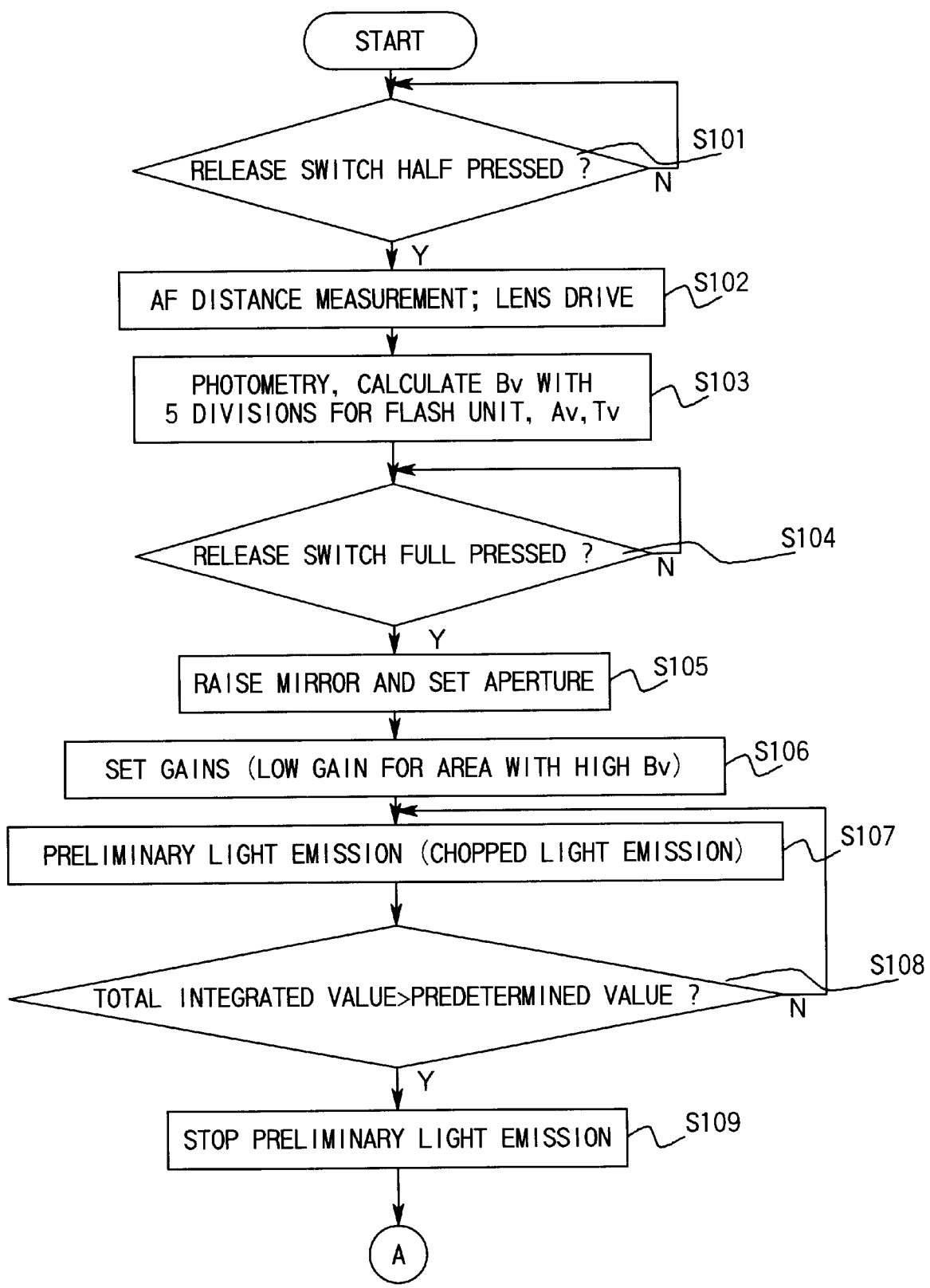
FIG. 5 is a first section of a flow chart for explanation of the operation of this flash control device according to the first embodiment.
Figure 6:
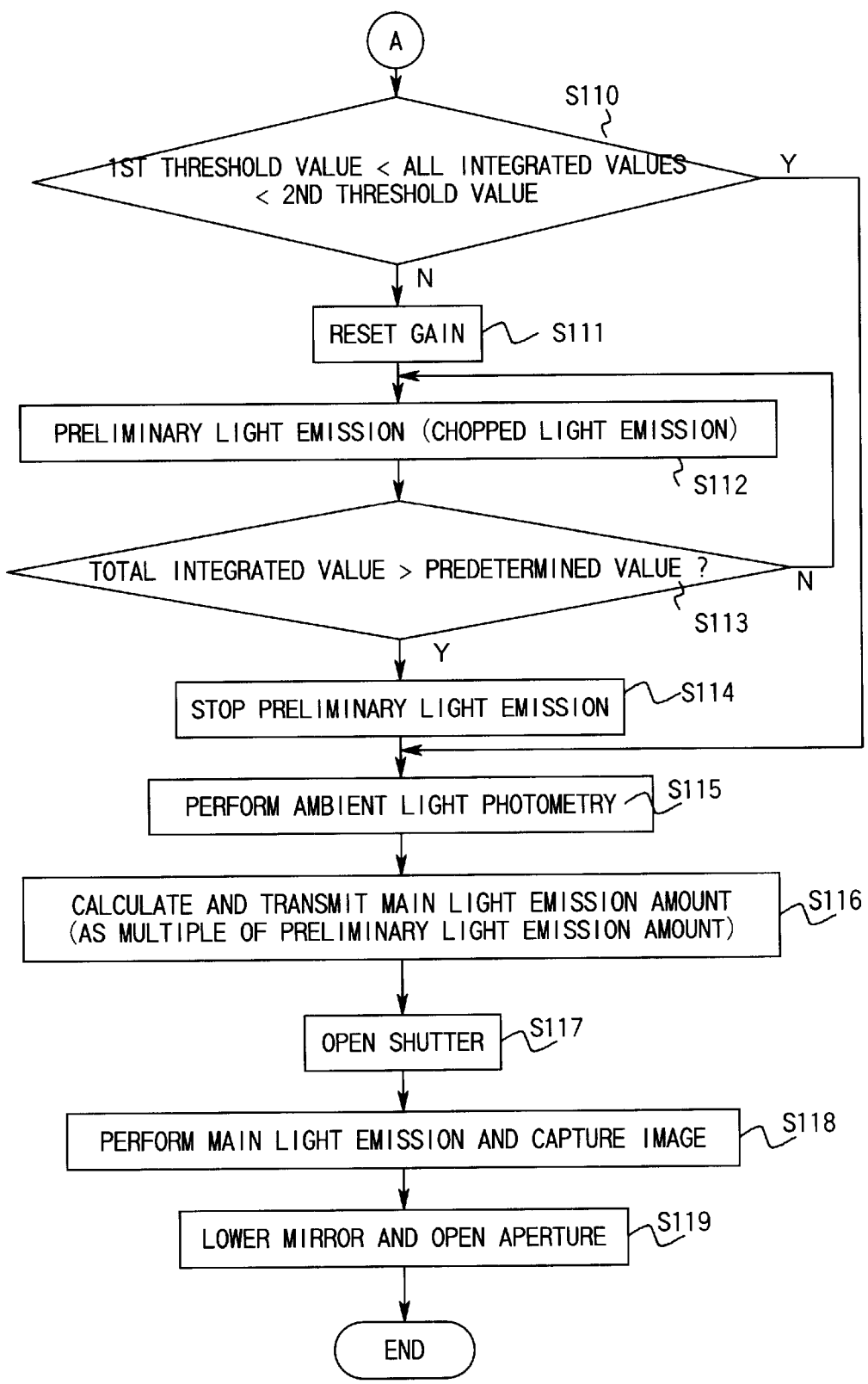
FIG. 6 is a second section of this flow chart for explanation of the operation of the flash control device according to the first embodiment.

FIGS. 5 and 6 are flow charts showing the operation of this flash control device for a camera according to the first embodiment.

First, in a step S101, the power source of the camera is turned on by the release switch 23 of the camera being half pressed, and the execution of a main program commences by an initialization procedure being performed in which communication is established with the lens microcomputer 31 provided within the interchangeable lens 34, and information for the lens optical system 36 such as the open aperture F value, the focal distance, the exit pupil position and the like are read in.

Next, in a step S102, AF distance measurement is performed by focal detection by the focus detection section 17, and the lens optical system 36 is driven by the lens drive section 35 until the calculated amount of defocusing becomes zero.

Next, in a step S103, ambient light photometry is performed by the photometric element 9 and the light intensity information for the areas B1 through B5 is obtained, and based upon these values ambient light exposure calculation is performed according to a per se conventional method, and a proper exposure value Bv is obtained. Further, an aperture opening value Av and a shutter value Tv for the time of photography are calculated from this proper exposure value Bv and the film sensitivity value.

When in a step S104 a shutter release signal is input by the full press of the release switch 23, in a step S105 the quick return mirror 2 is raised and the aperture 10 is closed down to a certain value.

Next, in a step S106, the light emission control section 25 receives a preliminary light emission command from the sequence control section 24, and makes the gain setting section 32 set amplification gains for the flash photometric section 26. At this time the gains are set low for areas in which the light intensity, i.e. the result of the photometry by the ambient light photometric section 21, is high.

Next in a step S107 preliminary light emission is performed by causing the flash emission section 27 (the flash emission device 15 of FIG. 1) to emit chopped light according to a predetermined guide number. And in a step S108 the chopped light emission by the flash emission section 27 is continued until the total integrated value from the flash photometric section 26 of the received light amount reaches a predetermined value, and then in a step S109 the preliminary light emission is stopped.

Referring to FIG. 6, in a step S110 the flash control section 29 decides whether or not at least one of the outputs (the integrated values generated in the flash photometric section 26 by the light reflected by the photographic subject during the preliminary light emission) for the divided photometric areas of the flash photometric section 26 is outside its predetermined range. In other words, it decides whether or not all these outputs are within their predetermined ranges.

In concrete terms, there are two possible cases: that at least one of the outputs of the flash photometric section 26 may be smaller than a first threshold value therefor which is set in advance; and that at least one of these outputs may be greater than a second threshold value therefor which is set in advance. Naturally, the second threshold value is greater than the first threshold value.

The reason for making a decision in this manner is because the dynamic range of the flash photometric section 26 is narrower than the ideally required range. In other words, when an integrated value (photometric value) for the preliminary light emission is smaller than the first threshold value, measurement with sufficient accuracy is not possible because the data value is too small so that it is swamped by noise. By contrast, when an integrated value (photometric value) for the preliminary light emission is greater than the second threshold value, this data value is considered as overflowing.

In this first embodiment, if for example the flash control section 29 has decided that at least one of the outputs of the flash photometric section 26 is smaller than the first threshold value, then the flow of control proceeds to a step S111 in which the gain for this photometric area of the flash photometric section 26 is reset. In concrete terms, only the amplification gain for the aforesaid photometric area of the flash photometric section 26 is reset to a large value, while the amplification gains for the other photometric areas are left as they are at their current values. However, it should be understood that, as an alternative, it would also be acceptable to set the amplification gains for the other photometric areas to small values, while setting the amplification gain for the aforesaid photometric area to a large value.

And, in a step S112, preliminary light emission is again performed by emitting chopped light, and photometry is performed upon this preliminary light emission. If in a step S113 it is decided that during the preliminary light emission the amount of light received by the flash photometric section 26 has attained a predetermined value, then in a step S114 a stop signal is output to terminate the preliminary light emission. By doing this it is possible to perform preliminary light emission photometry with acceptable accuracy, even for a photometric area for which the amount of reflected light during the preliminary light emission is low.

The reason why the outputs from one or more of the photometric areas are too small during the first episode of preliminary light emission photometry may be, first, because there is absolutely no light reflected from the photographic subject due to no photographic subject existing, or, second, because the reflection ratios of the various photographic areas differ too much and it can happen that the above mentioned stop signal is undesirably dispatched for the photometric areas for which the reflection ratio is high, while for the photometric areas for which the reflection ratio is low the preliminary light emission is stopped before sufficient electrical charge has been accumulated.

Although in the first case there is no possible expedient because the output is small due to the fact that there is actually no reflected light, in the second case there is a possibility of being able to perform photometry properly if the preliminary light emission amount or the amplification gain is increased, since the output is only hidden under the outputs of the photometric areas for which the reflection ratio is high.

Thus, during a second episode of preliminary light emission photometry, the gains for the photometric areas for which the reflection ratio is high are left at the same values, while the gains are only reset for the photometric areas for which the reflection ratio is low, i.e. for which the outputs during the first episode of photometry were too small, and by performing preliminary light emission photometry in the same manner as in the first episode, the outputs of the photometric areas for which the reflection ration is low, and it becomes possible to perform photometry accurately.

Further, if during the first episode of preliminary light emission photometry any one of the outputs of the flash photometric section 26 was greater than the second threshold value, then the gain of this photometric area is reset to a low value, so as to ensure that this output definitely does not overflow when the second episode of preliminary light emission is performed; and thereby it becomes possible to perform photometry with good accuracy.

In a step S116 calculation of the main light emission amount is performed. As a basic calculation, the integrated value for the preliminary light emission and some standard value are compared, and it is calculated at what multiple of the strength of the preliminary light emission light emission of that strength would reach a standard exposure amount at the imaging surface, and this value is transmitted to the light emission control section 25, so that thereby main light emission is caused to be performed at this multiple of the strength of the preliminary light emission.

Apart from this, values such as the photographic distance and the like are used for delicate adjustment according to the state of the photographic subject. For example, it is possible to estimate the reflection ratio of the photographic subject from the photographic distance, the integrated value of the preliminary light emission and the preliminary light emission guide number, and the above described main light emission amount is calculated by excluding areas which have abnormal reflection ratios as compared with those of the subdivided photographic field. By doing this, photography can be appropriately performed even for a scene in which the photographic subject is partially not present, or for a scene in which a flash of light directly reflected by a metal surface is present, or the like.

Next in a step S117 the shutter 11 is fully opened, and, when a command for main light emission is output from the light emission control section 25 to the flash emission section 27, in a step S118 the flash emission section 27 performs main light emission according to the main light emission amount which has been calculated by the emission amount calculation section 30, while image-capturing upon the image-capturing element 14 is performed. And the sequential procedure is completed in a step S119 by lowering the mirror and opening the aperture.

In this manner it becomes possible to perform photometry with acceptable accuracy according to this first embodiment, since if the flash control section 29 has determined that at least one of the outputs of the flash photometric section 26 is smaller than the first threshold value or is greater than the second threshold value, then it resets the gains for the photometric areas of the flash photometric section 26, and performs the preliminary light emission and the preliminary light emission photometry for a second time.

Embodiment 2

Figure 7:
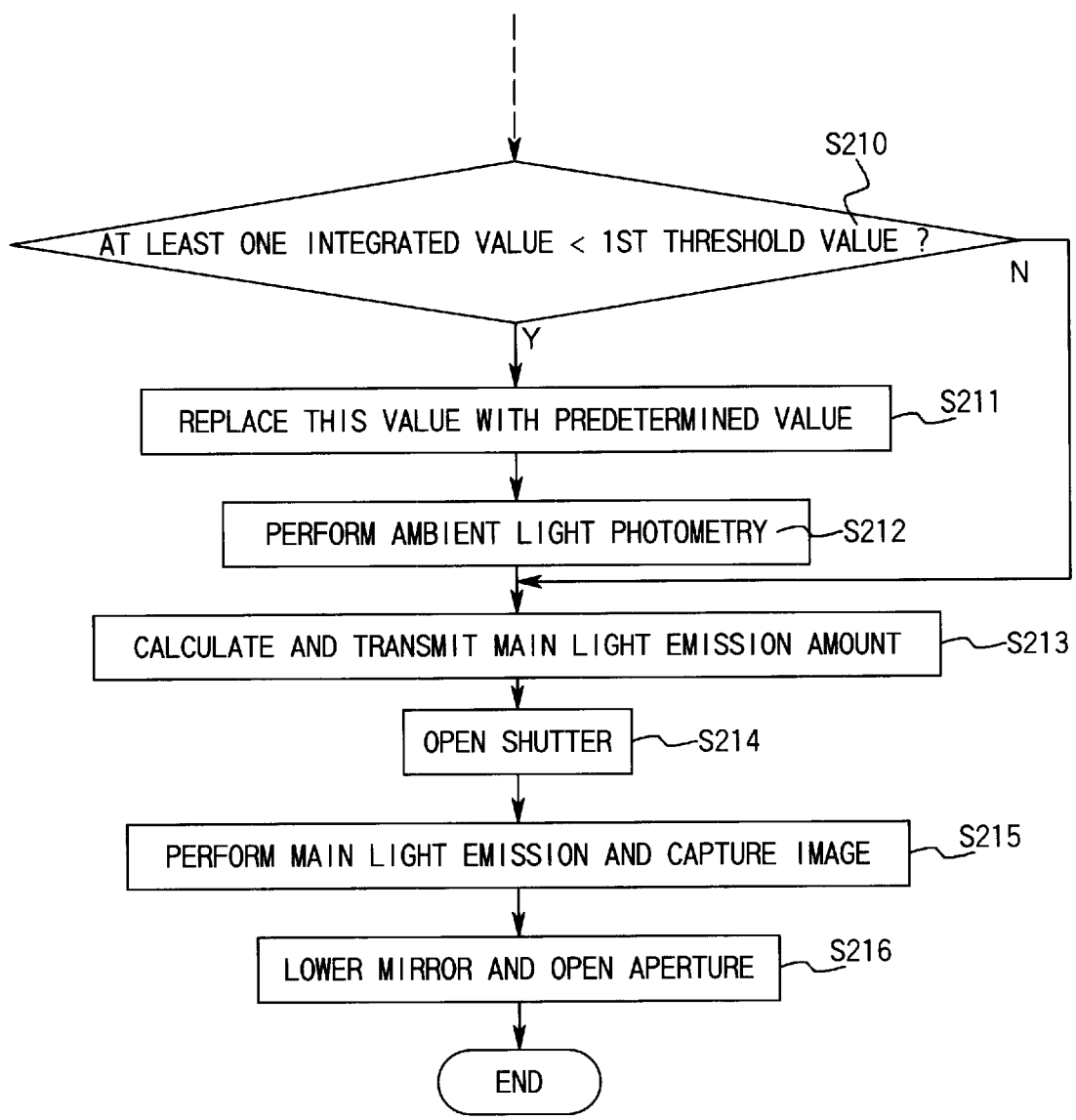
FIG. 7 is a flow chart for explanation of the operation of a flash control device according to a second preferred embodiment of the present invention.

FIG. 7 is a flow chart for explanation of the operation of a flash control device for a camera according to the second preferred embodiment. Since in each of the embodiments shown below the construction of the optical system and of the other hardware can be realized in a manner identical to that for the first preferred embodiment described above and these embodiments differ only by various portions of the flash control procedure etc., it should be understood that, accordingly, only the flow charts for these embodiments will be shown and explained. Further, since the steps S101 up through S109 of the flow chart of FIG. 5 can be utilized in common, only the steps subsequent thereto will be shown and explained.

In this second embodiment, the flash control section 29 decides in a step S210 whether or not at least one of the outputs of the flash photometric section 26 is less than a first threshold value, and if the result of this decision is YES then in a step S211 a value predetermined in advance is substituted for the output of the corresponding photometric area of the flash photometric section 26.

In the case that the returned light reflected from the photographic subject is insufficient, the flash photometric section 26 is operating outside the range in which proper photometry is possible, and the linearity is deteriorated. When the analog voltage which is output from the flash photometric section 26 is subjected to A/D conversion and is input to a microcomputer, it can happen that when the output is small the A/D converted value becomes zero.

In the main light emission amount calculation section 30, a main light emission amount which yields the proper exposure value for the n-th photometric area is calculated according to the following equation from the outputs (the preliminary light emission integrated values) of the flash photometric section 26 and the values of sensitivity etc., but in the calculation at this time the reciprocals of the outputs of the flash photometric section 26 appear.

$$GNrtn[n]=GNpre\sqrt{(Const*G[n]/IG[n])} \quad (1)$$

where:
 GNrtn[n] is a guide number which yields a proper exposure value for the n-th area;
 GNpre is a preliminary light emission guide number;
 IG[n] is the flash photometric section output (the preliminary light emission integrated value) for the n-th area;
 G[n] is the amplification gain of the flash photometric section for the n-th area;
 Const is a reference value (a constant); and
 n is the serial number of each area in order, and ranges from 1 to 5;

Due to this, it is not possible to calculate the main light emission amount when the A/D value of an output of the flash photometric section 26 is zero, because it diverges to infinity. Therefore when an output of the flash photometric section 26 is small, calculation of the main light emission amount is made possible by replacing by a value determined in advance.

This replacement value is obtained in advance as a result of experiment. If it is taken to be a positive integer, although it may be replaced in the equations just as it is, when calculating its reciprocal, by multiplying by 2 or by 4, in essence it is replaced by 0.5 or by 0.25.

Further, if in the first episode of preliminary light emission photometry at least one of the outputs of the flash photometric section 26 is greater than a second threshold value, then, in the same manner as with the first embodiment, by resetting the gain of this photometric area to be low, and by performing preliminary light emission and flash photometry for a second time, it is ensured that the output does not go overflow this time, and by doing this it becomes possible to perform photometry with excellent accuracy.

Embodiment 3

Figure 8:
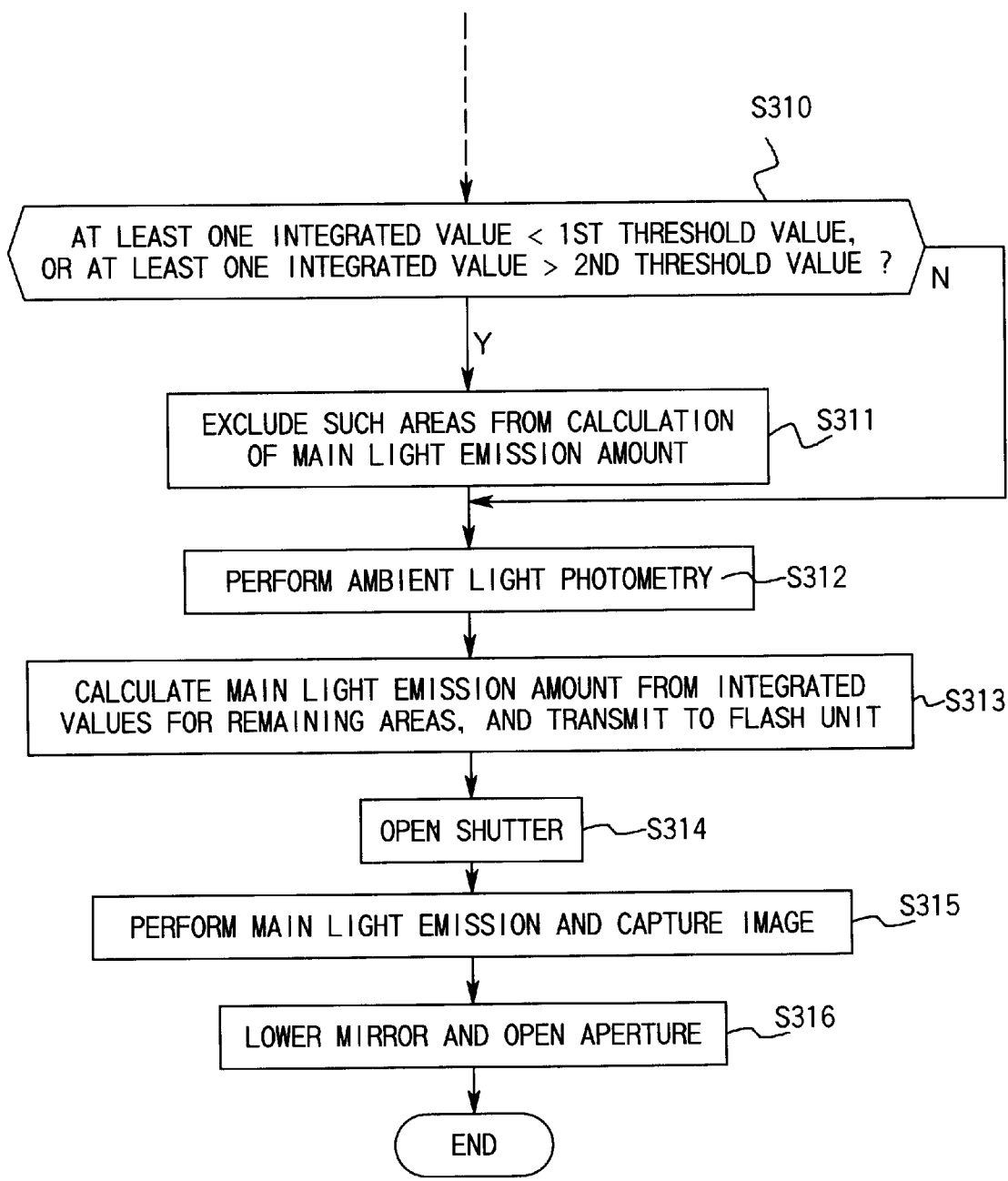
FIG. 8 is a flow chart for explanation of the operation of a flash control device according to a third preferred embodiment of the present invention.

FIG. 8 is a flow chart for explanation of the operation of a flash control device for a camera according to the third preferred embodiment. In this third embodiment, the flash control section 29 determines in a step S310 whether or not at least one of the outputs of the flash photometric section 26 is less than a first threshold value, or is greater than a second threshold value, and if the result of this decision is YES then in a step S311 it is arranged that this photometric area is not used in the calculation by the main light emission amount calculation section 30.

By doing this, data for which there can be no expectation of accuracy is excluded from being used in the calculation, and it thereby becomes possible to obtain an appropriate main light emission amount.

The main light emission calculation section 30 calculates a main light emission amount based upon the preliminary light emission integrated values from the flash photometric section 26, the photometric value from the ambient light photometric section 21, the photographic distance value from the lens microcomputer 31, a preliminary light emission guide number from the flash emission section 27, the aperture opening value from the exposure calculation section 22, the sensitivity value from the sensitivity setting section 28, and the like, and outputs this value to the light emission control section 27. As a basic calculation, the preliminary light emission integrated value and some reference value are compared, and it is calculated at what multiple of the strength of the preliminary light emission light emission of that strength would reach a standard exposure amount at the imaging surface, and this value is transmitted to the light emission control section 25, so that thereby main light emission is caused to be performed at this multiple of the strength of the preliminary light emission amount. The main light emission amount can be obtained by the following equation, in the case of the number of subdivided regions being five:

$$GN=GNpre*\sqrt{(IGstop/(mval*\Sigma(IG[n]*Wt[n])))} \quad (2)$$

where:
 GN is a main light emission guide number which yields a proper exposure amount;
 GNpre is a preliminary light emission guide number;
 IGstop is the total of the preliminary light emission integrated values IG[n] when the stop signal is dispatched from the flash photometric section;
 mval is the number of valid regions, which is five if no area is excluded;
 IG[n] is the preliminary light emission integrated value for the n-th area; and Wt[n] is the area weight, for each area. The necessary emission amount over the whole photographic field is obtained through a weighted average. The total of all the Wt [n] equals unity.

The multiple of the preliminary emission amount which is transmitted to the light emission control section 25 and the flash emission section 27 can be obtained from the portion after the square root of the equation.

With this third embodiment, as has already been described, when there is a photometric area for which the output of the flash photometric section 26 (the preliminary light emission integrated value IG) is less than the first threshold value, or is greater than the second threshold value, this area is excluded from the calculation of the above equation. When one region of the five has been thus excluded, this photometric area is not added into the sum, and the number mval of valid regions may be taken as four. By doing this, it is possible to obtain an appropriate main light emission amount.

Embodiment 4

Figure 9:
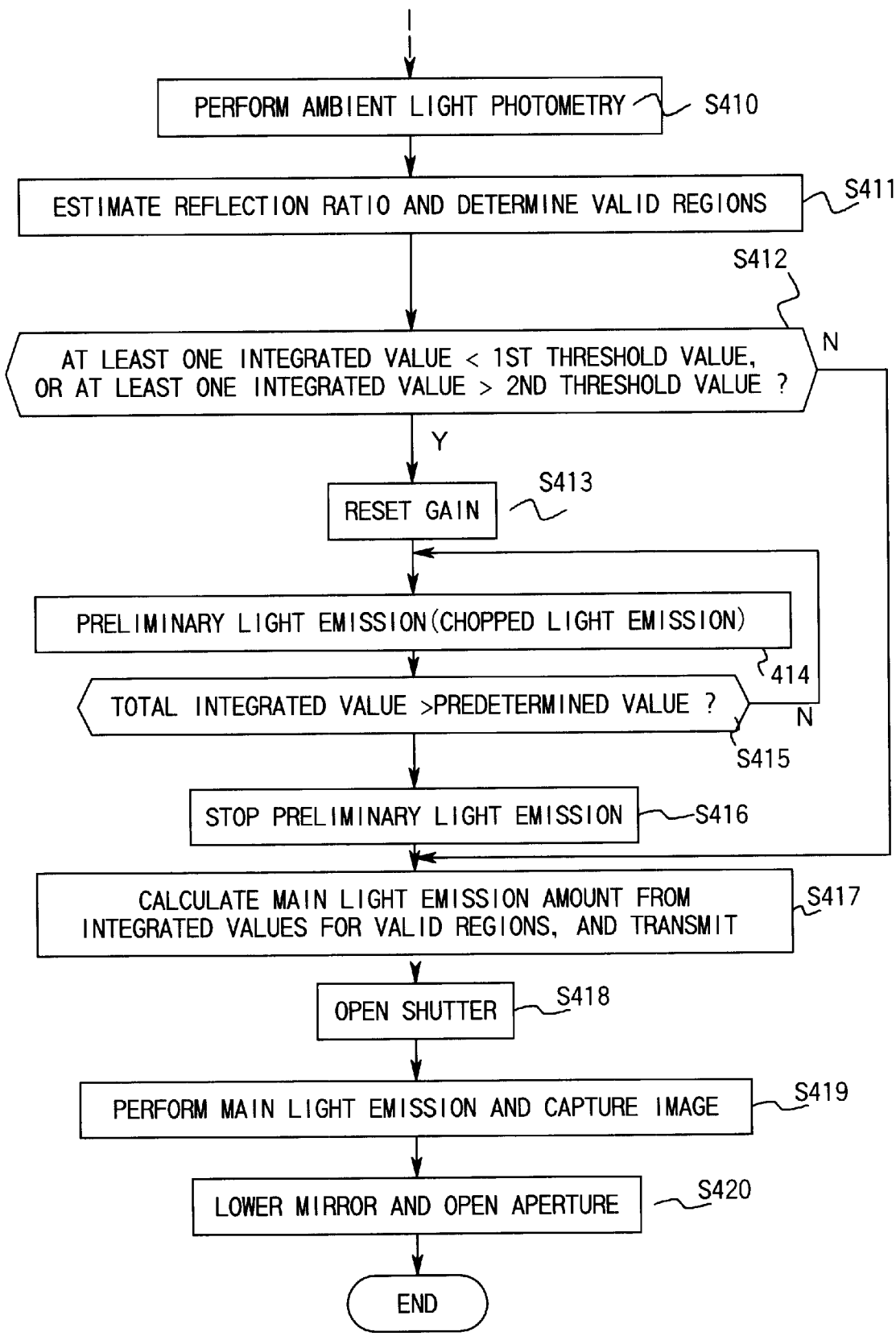
FIG. 9 is a flow chart for explanation of the operation of a flash control device according to a fourth preferred embodiment of the present invention.

FIG. 9 is a flow chart for explanation of the operation of a flash control device for a camera according to the fourth preferred embodiment. In this fourth embodiment, the regions which are used in the main light emission amount calculation and are to be considered valid are determined in a step S411, based upon the photometric results of preliminary light emission. In other words, the reflection ratio of the photographic subject, divided up into five regions, is determined from the photometric values of preliminary light emission, the photographic distance as detected by the distance encoder 37 on the lens side, the guide number for preliminary light emission, and the amplification gain which was set upon the flash photometric section 26.

In concrete terms, since the amount of light emitted by the flash emission section 27 during the preliminary light emission can be found from the guide number for preliminary light emission, it is possible to obtain, from this and the photographic distance, the light amount which would be expected to be reflected back if the photographic subject were a wall which had a uniform and standard reflection ratio. Because this value is proportional to the light amount during preliminary light emission, and is inversely proportional to the square of the photographic distance.

On the other hand, the amount of light which is returned from the actual photographic subject is determined from the photometric result output for preliminary light emission and the amplification gain, and from the difference of these two values an average reflection ratio for each area of the photographic subject is estimated.

Now, the reflection ratio may become extremely great or extremely small for a portion which corresponds to one area of the photographic subject, such as in the case of a scene in which the photographic subject is partially not present so that extremely little light is reflected, or in the case that the reflected light level is extremely high as can be due to regular reflection from a metal object.

In this fourth embodiment, this type of photometric area is detected by comparison with a threshold value, and it is not used in the calculation of the main light emission amount. In other words it becomes possible to obtain a photograph with a desirable exposure, since it is possible to perform light adjustment only for the portions of the photographic subject which have medium reflection ratio, like a human figure etc., while excluding the areas with the most extreme reflection ratios.

Next, after determining in the step S411 the valid regions to be used in calculating the main light emission amount based upon the estimated reflection ratios, it is decided in a step S412 whether or not a second episode of preliminary light emission is required. In this step, the outputs of the photometric results for preliminary light emission of the regions which have been decided as valid regions are reconsidered, and it is decided that a second episode of preliminary light emission and preliminary light emission photometry is required, if at least one of them is smaller than a first threshold value which has been determined in advance, or is greater than a second threshold value.

Just as in the case of the first embodiment, the reason for this is in order to guard against the phenomenon that photometry with good accuracy cannot be performed if an output is too small or is too large. On the other hand, in this embodiment, after determination of the valid regions, it is decided whether or not a second episode of preliminary light emission is required. It may be possible to eliminate the futility of performing a second photometry on the data from the invalid regions.

If it is decided that a second episode of preliminary light emission is required, then via the YES branch from S412 the amplification gains of the flash photometric section 26 are reset in a step S413 to appropriate magnitudes, and then in a step S414 the light emission control section 25 causes the flash emission section 27 to perform this second episode of preliminary light emission, and then in a step S415 the flash photometric section 26 performs photometry for a second time upon the light which is returned from the photographic subject.

The main light emission amount calculation section 30 uses the preliminary light emission photometry value which has been obtained in this manner in its calculation to supplement the result for preliminary light emission photometry value which was obtained during the first episode of photometry.

The main light emission amount calculation section 30, in the same manner as in the third embodiment, calculates a main light emission amount based upon the photometric results for preliminary light emission for the valid regions, and communicates this in a step S417 to the light emission control section 25 and to the flash emission section 27. After this, in a step S418 the shutter 11 opens, the photographic subject is exposed in a step S419 onto the image-capturing element 14, the mirror is lowered, the aperture is opened in a step S420, and the sequence of procedures is terminated.

Since the flash emission section 27 performs light emission according to the main light emission amount which was obtained, it is possible to obtain a photograph with a desirable exposure.

A Variant Embodiment

The present invention is not to be considered as being limited to the first through fourth embodiments disclosed above; various variations and changes are possible without departing from the scope of the present invention.

(1) Although in the step S108 of FIG. 5 it was explained by way of example that the stop signal was generated when the total integrated value of the received light reached a predetermined value, it would also be acceptable for the stop signal to be generated when the number of repetitions of chopped light emission reached a predetermined number of repetitions.

(2) Although the above explanation was made in terms of exposure upon an image-capturing element 14, the present invention is equally applicable to the case of exposure upon a silver halide film.

Embodiment 5

Figure 10:
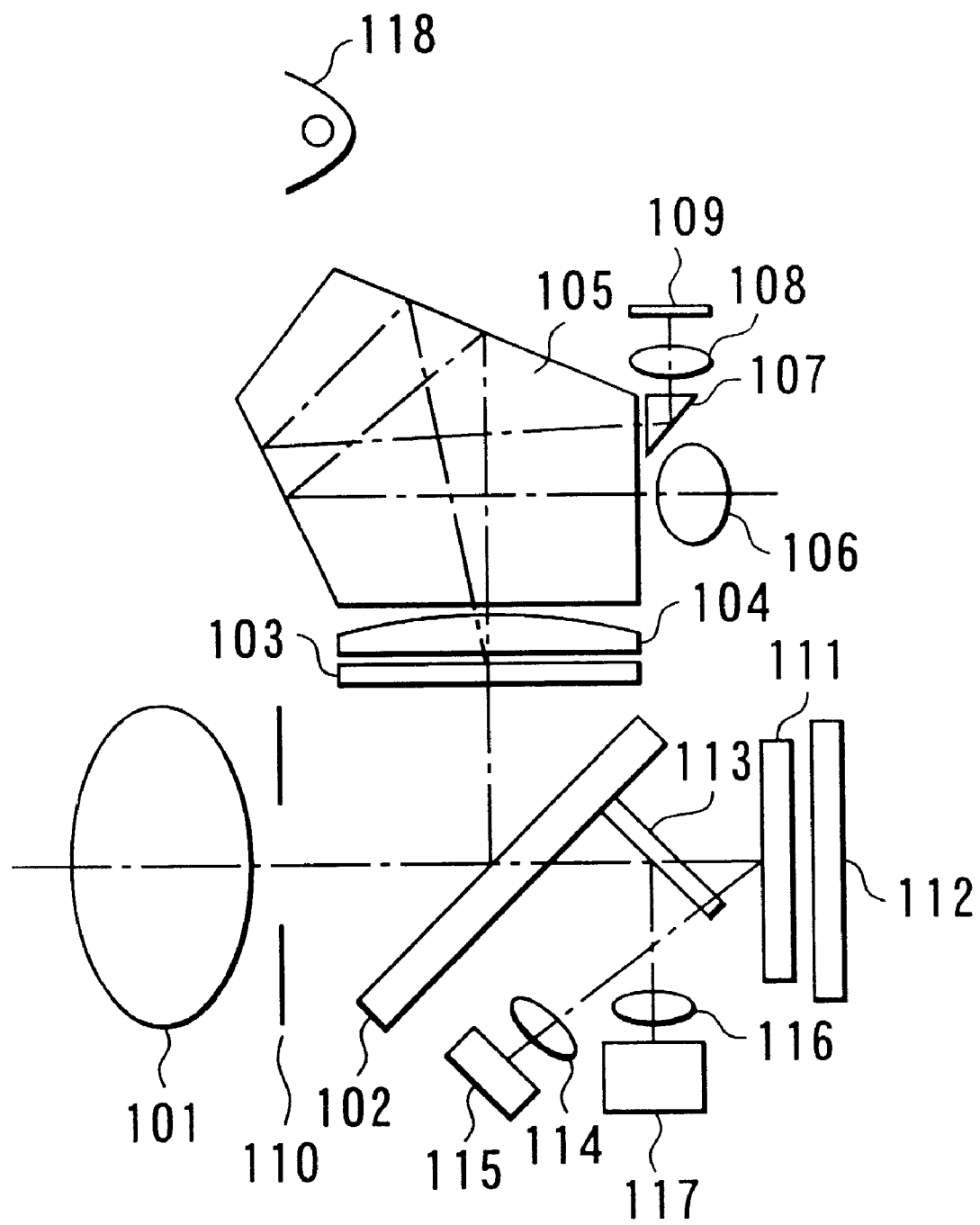
FIG. 10 is a figure showing the optical system of a fifth preferred embodiment of the flash control device according to the present invention.

FIG. 10 is a figure showing the optical system of a fifth preferred embodiment of the flash control device for a camera according to the present invention. A ray bundle which has passed through a photographic lens 101 is deflected by a main mirror 102 and is temporarily focused into an image upon a diffusion screen 103. After this it passes through a condenser lens 104, a pentaprism 105 and an eyepiece lens 106 to reach the eye of a photographer.

On the other hand, a portion of the ray bundle which has been diffused by the diffusion screen 103 passes through the condenser lens 104, the pentaprism 105, a prism 107 for photometry, and a lens 108 for photometry, to be focused into an image upon an ambient light photometric element 109.

Figure 12A:
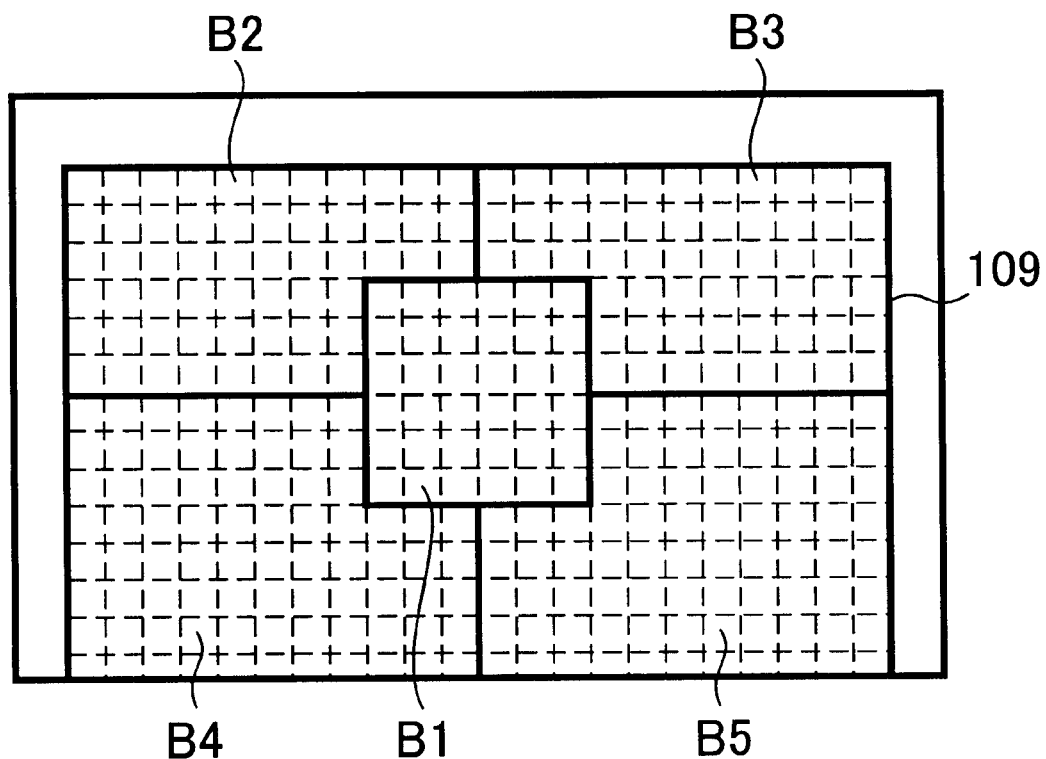
FIGS. 12A and 12B are figures showing a division pattern of an ambient light photometric section of this flash control device according to the fifth embodiment.

The photometric element 109 may utilizes light receiving elements for example a CCD (charge coupled device), and may have a structure such as that shown in FIG. 12A in which the photographic field is subdivided into 22×15=330 regions upon which photometry is performed individually and for which photometric values are individually output.

Figure 12B:
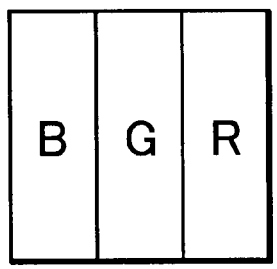

Further, each of the individual regions may possess three photometric cells for red light (R), green light (G), and blue light (B) as shown in FIG. 12B, and may be able to perform photometry for each of these colors individually.

When photography is to be performed, first the main mirror 102 is raised up out of the way at the same time that an aperture 110 is adjusted to a predetermined value. After this, at the time of preliminary light emission, a partial ray bundle which has been roughly focused into an image upon a shutter 111 and reflected is refocused through a light adjustment lens 114 into an image upon a light adjustment element 115; and, at the time of main light emission, the shutter 111 is opened, and the ray bundle is focused into an image upon the light receiving surface of an image-capturing element 112 which, for example, may consist of a CCD (charge coupled device) or the like.

Figure 14:
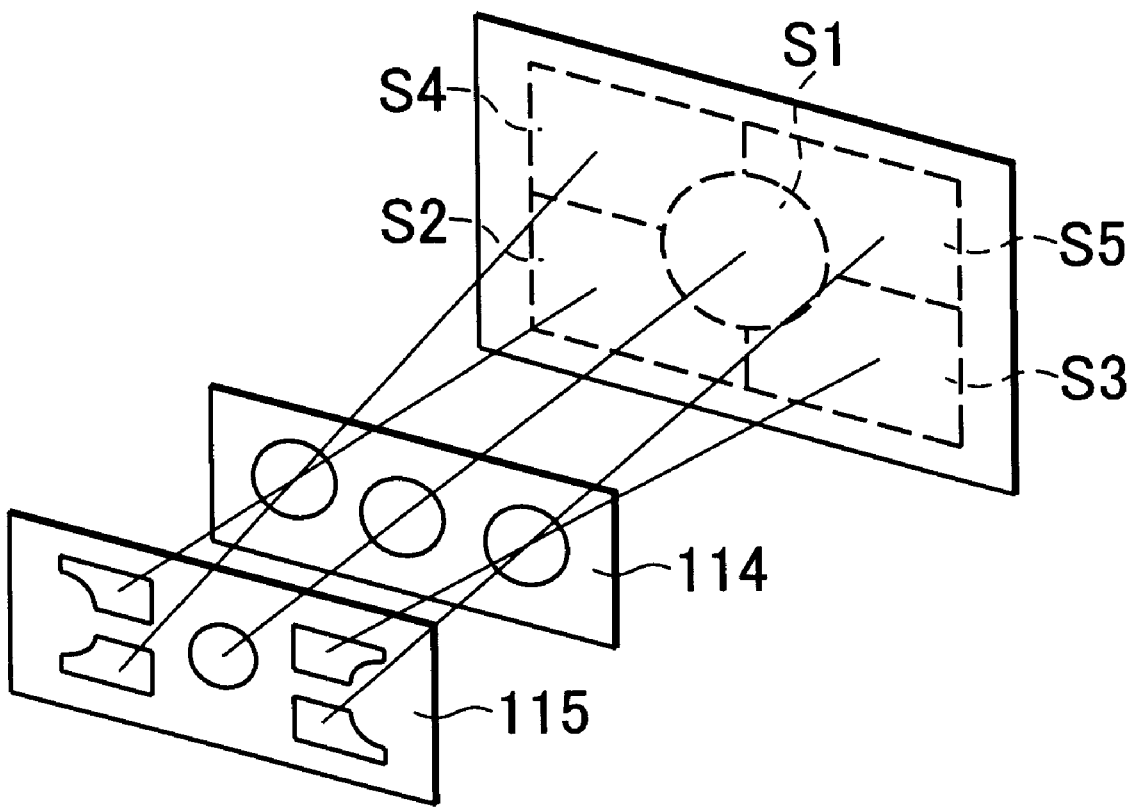
FIG. 14 is a figure showing the optical system and the a division pattern of the flash photometric section of this flash control device according to the fifth embodiment.

The light adjustment element 115 consists of an SPD, a capacitor which accumulates the photoelectric current from the SPD, an amplifier etc., and as shown in FIG. 14 is divided up into five regions S1 through S5, which correspond to the regions B1 through B5 in FIG. 12A.

Further, the main mirror 102 is made as a half mirror which passes a portion of the light incident upon it, and a portion of the ray bundle which has passed through is deflected downwards by a sub-mirror 113, passes through a separator lens 116, and arrives at an auto-focus sensor 117 which may, for example, consist of a CCD (charge coupled device) or the like.

Figure 13A:
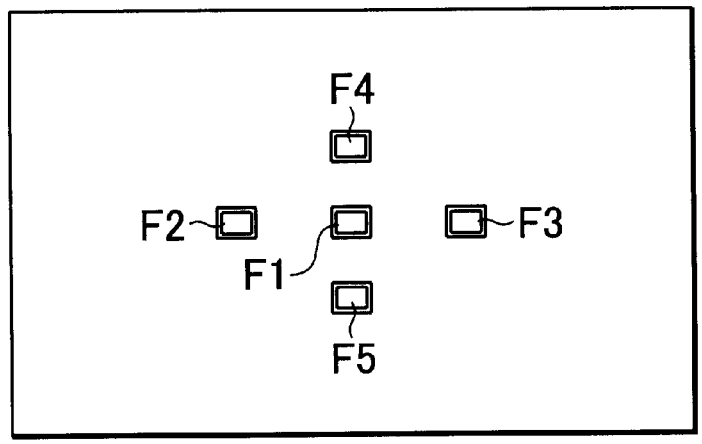
FIG. 13A is a figure showing regions of a focus detection section of this flash control device according to the fifth embodiment.

The auto-focus sensor 117 detects the focal condition for each of five focal detection regions F1 through F5 in the photographic field as shown in FIG. 13A, and drives the photographic lens 101 until the focal state in one of these regions reaches the properly focused state. Which of these focal detection regions is the one which is thus focused may be selected manually by the photographer, or may be selected based upon the least distance or the like.

Figure 11:
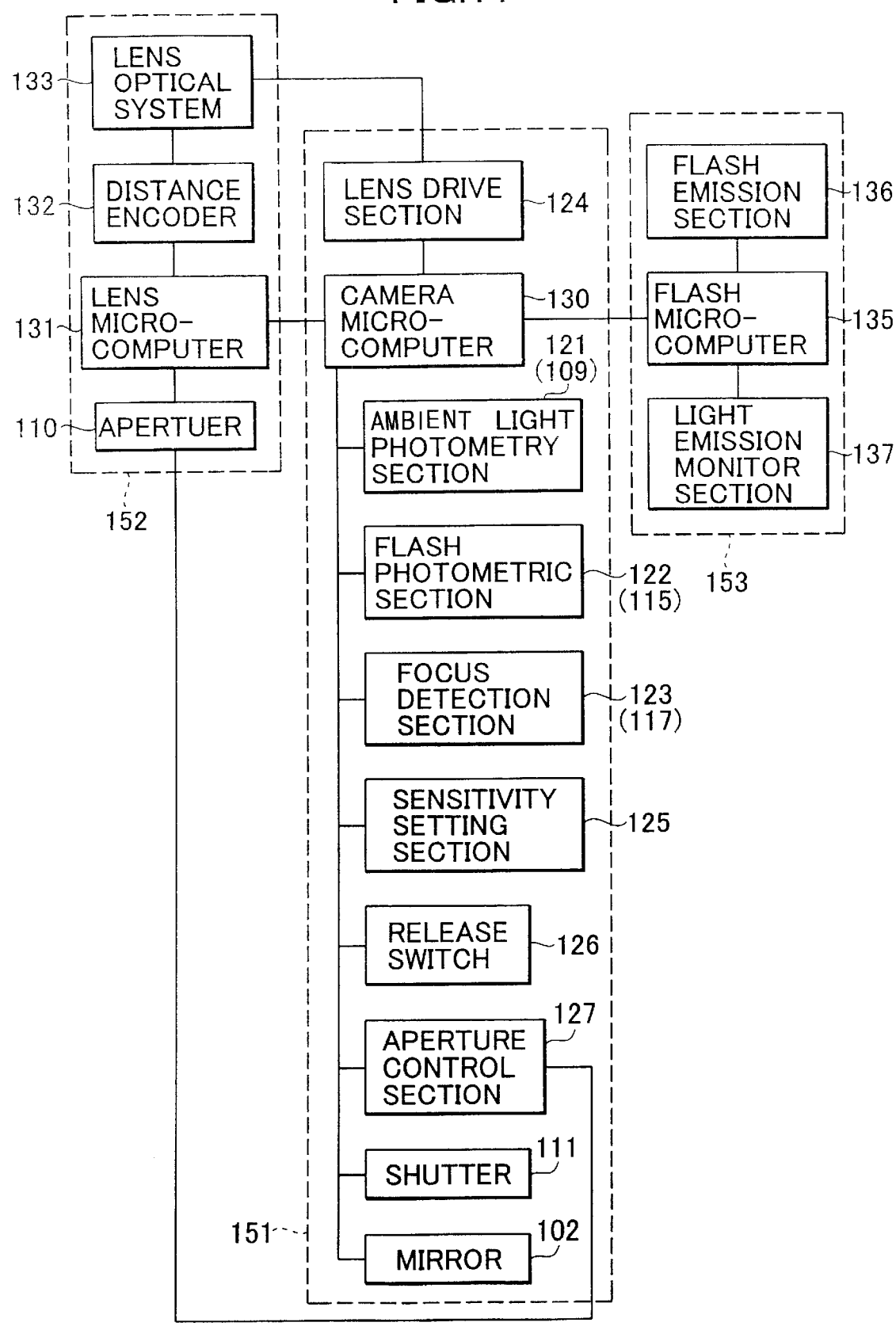
FIG. 11 is a block diagram showing the structure of the flash control device according to this fifth embodiment.

FIG. 11 is a block diagram showing the general structure of this fifth embodiment of the flash control device. The overall control within a main body 151 of the camera is performed by a camera microcomputer 130 which is a microprocessor.

The Procedure for Photometry and Exposure

An ambient light photometric section 121, as shown in FIG. 12A, is a circuit for photometry which divides up the photographic field into 22×15=330 portions, and its photometric output is output to the camera microcomputer 130.

The camera microcomputer 130 calculates a proper exposure value related to ambient light exposure based upon the output from the ambient light photometric section 121, lens information such as the open aperture F value, the focal distance, the exit pupil position and the like of the photographic lens stored within the lens microcomputer 131 which is provided to the photographic lens 152, sensitivity information for the image-capturing element 112 from the sensitivity setting section 125, and the like, separates this into an aperture value and a shutter value, and outputs these to the aperture control section 127 and the shutter 111.

The aperture control section 127 performs closing and return control for the aperture 110 in response to a release signal from the release switch 126.

The Auto-focus Procedure

The focus detection section 123 detects the focal condition for the five regions of the photographic field shown in FIG. 13A. This information is processed by the camera microcomputer 130 and is output to the lens drive section 124 as a lens drive amount, and the lens optical system 133 within the lens main body 152 is driven to the properly focused condition based upon the information. At this time the amount of displacement of the lens optical system 133 is detected by a distance encoder 132, and is transmitted via the lens microcomputer 131 to the camera microcomputer 130.

The Flash Procedure

The camera microcomputer 130 calculates a gain to be set for the flash photometric section 122 based upon the photometric value, the aperture opening value, the sensitivity value, the distance value, the bounce state of the flash emission section 136 and the like, and performs gain setting for the flash photometric section 122. After this, the camera microcomputer 130 causes the flash emission section 136 to perform preliminary light emission via a flash microcomputer 135 within the flash unit main body 153, and the flash photometric section 122 integrates the light which is reflected back from the photographic subject. And the camera microcomputer 130 calculates a main light emission amount indication value based upon this integrated value, and outputs this main light emission amount indication value to the flash microcomputer 135 for a second time.

The flash microcomputer 135 calculates the main light emission amount from the main light emission amount indication value and the preliminary light emission value for which the light emission monitor section 137 itself performed photometry, and starts light emission by a light emission trigger signal (an X-signal) at the time of photography and controls the amount thereof. It should be understood that the light emission monitor section 137 does not perform photometry on the light reflected from the photographic subject, but performs direct photometry on the emission light from the flash emission section 136 inside the flash unit main body 153.

FIG. 12A is a figure showing the pattern of division of the photometric element 109 as compared with the photographic field. The photometric element 109 is constructed so as to be able to divide up nearly the entire photographic field into 330 regions upon which it performs photometry and for which it outputs respective photometric values. Further, it is constructed so as to be able to output photometric values for regions B1 through B5 averaged over the photometric region which correspond to the pattern of division of the flash photometric section 122.

FIG. 12B is a figure showing that each of the photometric regions is divided up into three photometric regions for red (R), green (G), and blue (B).

FIG. 13A is a figure showing the detection regions of the focus detection section 123 as compared with the photographic field. This focus detection section 123 is structured so as to be able to detect the focal condition individually for five regions F1 through F5.

Figure 13B:
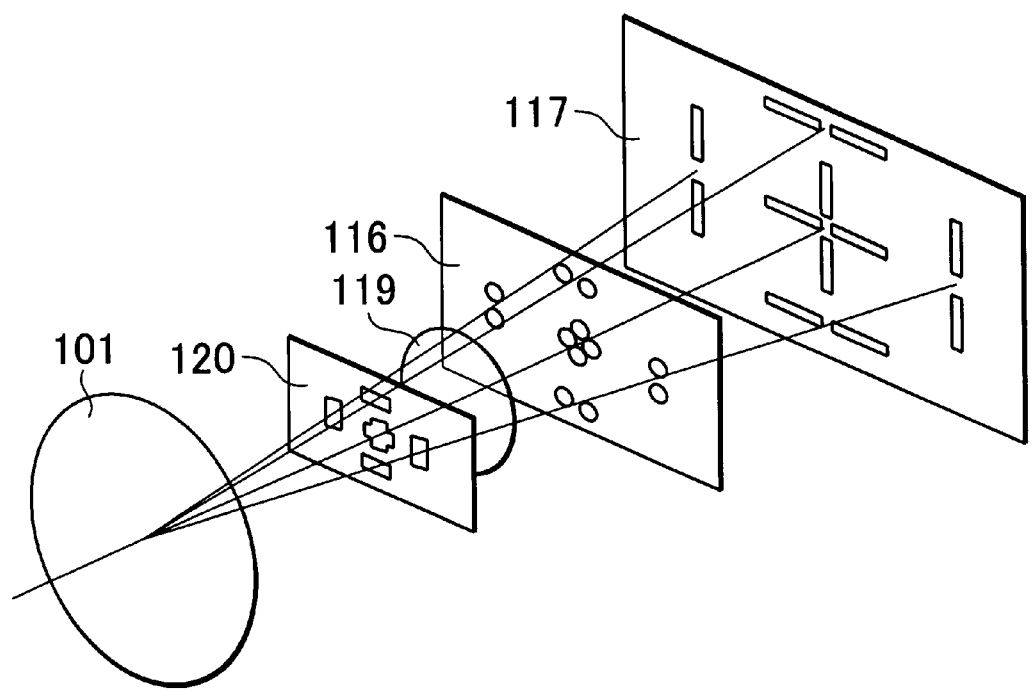
FIG. 13B is a figure showing the optical system of this focus detection section of this flash control device according to the fifth embodiment.

FIG. 13B is a figure showing the optical system of the focus detection section 123 in detail. This optical system of the focus detection section 123 comprises a photographic lens 101, a visual field mask 120, a field lens 119, a separator lens 116, and an auto-focus sensor 117.

FIG. 14 is a figure showing the optical system of the flash photometric section 122 and its division pattern into photometric regions. This section 122 is structured so as to refocus an image of the photographic subject, which is incident and focused into an image upon the shutter surface, into an image upon a light adjustment element 115 by a set 114 of three lenses for light adjustment; and this image is separated into five regions S1 through S5 for each of which photoelectric conversion is performed and electric charge is accumulated. Here, the numbering of the five regions S1 through S5 corresponds to the numbering of the five photometric regions B1 through B5 shown in FIG. 12A.

Figure 15:
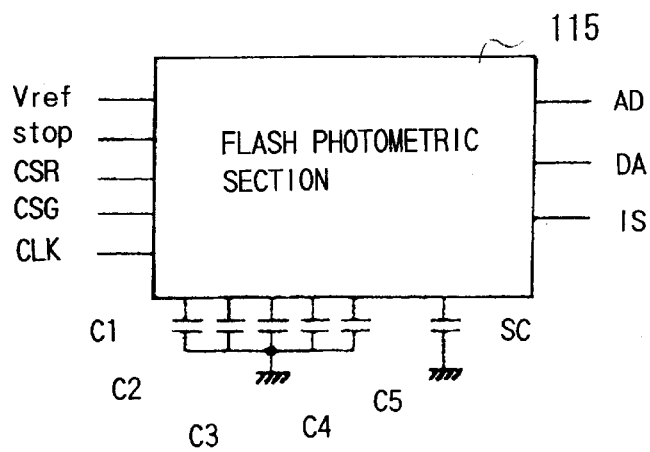
FIG. 15 is a figure showing terminals of a light adjustment element of this flash control device according to the fifth embodiment, for easy explanation of their roles.

FIG. 15 is a figure for easy explanation of the terminals of the light adjustment element 115 and their roles. C1 through C5 are external capacitors for accumulation of photoelectric currents from the regions S1 through S5; SC is an external capacitor which accumulates the sum of the photoelectric currents from the regions S1 through S5 for output of a stop signal; Vref is a terminal for temperature proportional voltage output; stop is a stop signal output terminal; and CSR, CSG, and CLK are terminals to switchover setting of amplification gain and readout channel. The method of setting will be explained hereinafter with reference to FIGS. 16 and 17. IS is a terminal which performs accumulation start and stop; DA is a terminal for input of the amplification gain for each region; and AD is an output terminal for the integrated photometric values for the regions.

Figure 16:
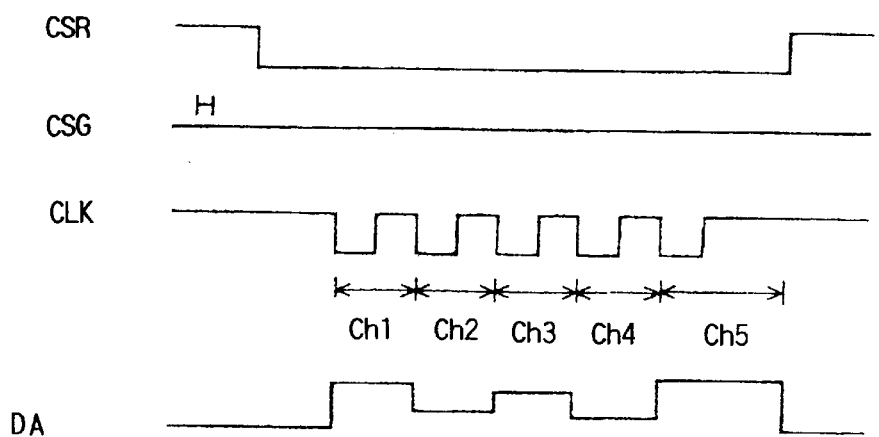
FIG. 16 is a figure showing terminals of a light adjustment element of this flash control device according to the fifth embodiment, for easy explanation of their roles.

FIG. 16 is a time chart showing the manner in which the amplification gain for each region of the light adjustment element 115 is set. With the CSG terminal kept at H level the CSR terminal goes to L level, and, when subsequently a clock signal is input at the CLK terminal, the channel is changed over synchronously with the transition to L level. By bringing the DA terminal to a voltage level corresponding to the set gain while the CLK signal is at L level, the gain for the current channel is set. Channels 1 through 5 respectively correspond to the regions S1 through S5.

Figure 17:
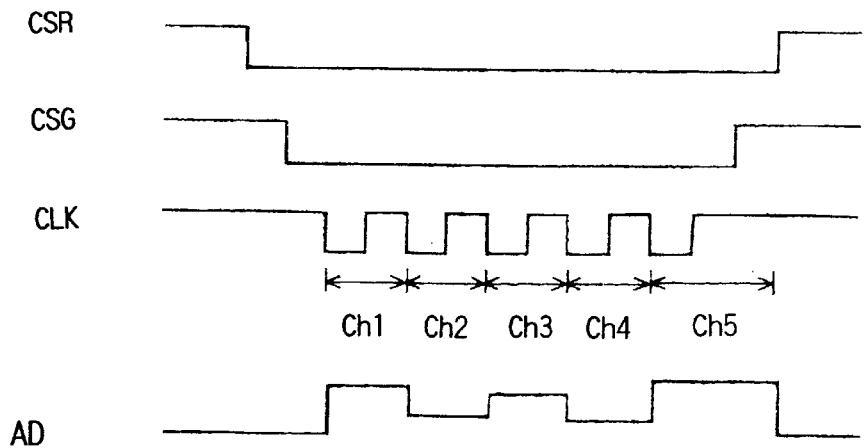
FIG. 17 is a figure showing terminals of a light adjustment element of this flash control device according to the fifth embodiment, for easy explanation of their roles.

FIG. 17 is a time chart showing the manner in which the integrated photometric value for each region of the light adjustment element 115 is read out. After the CSR and the CSG terminals have been brought to L level, when subsequently a clock signal is input at the CLK terminal, the channel is changed over synchronously with the transition to L level, and the integrated photometric value for each region is output at the AD terminal at a voltage level which corresponds to the photometric value.

Figure 18:
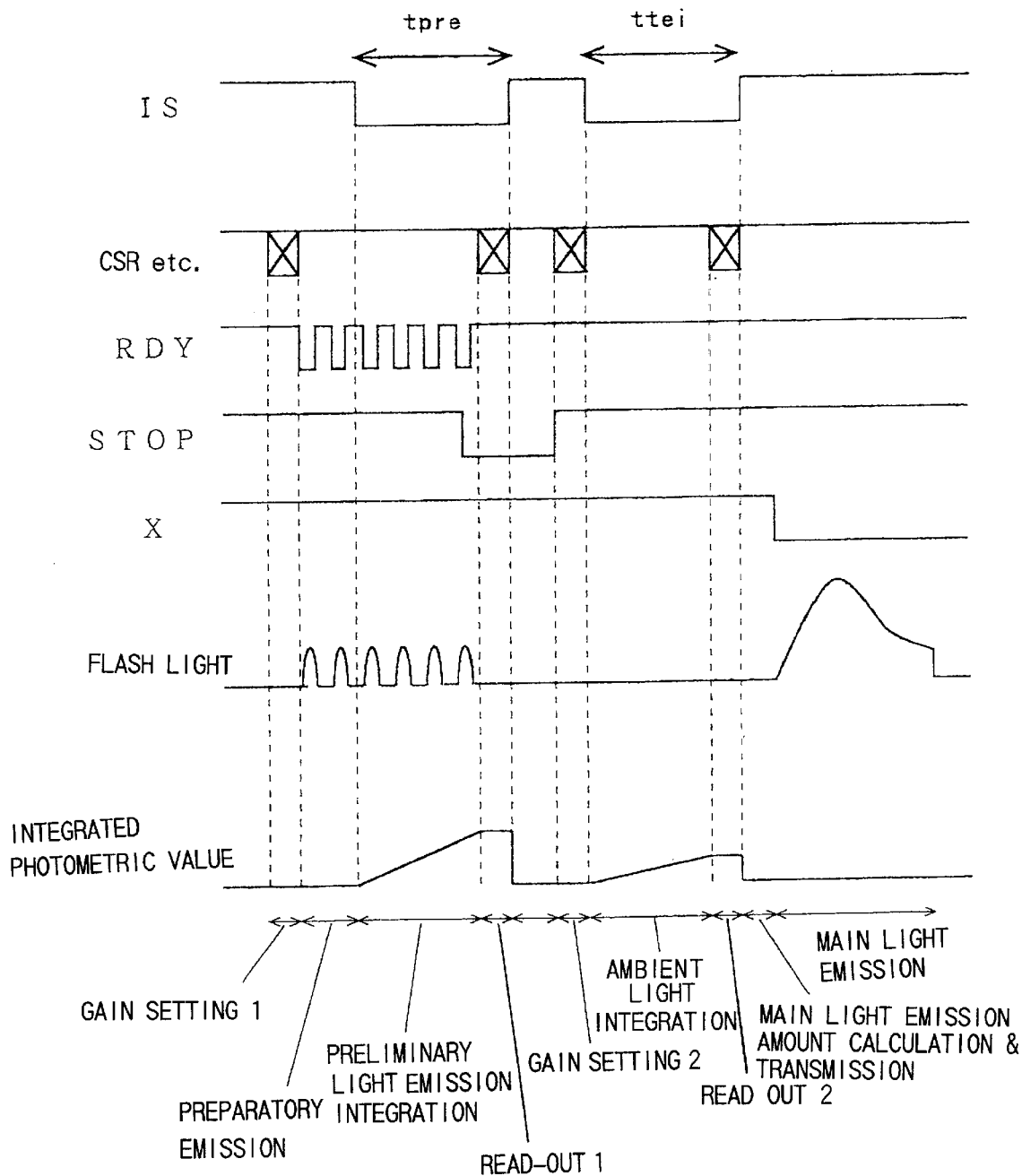
FIG. 18 is a figure easily showing an emission operation of the flash control device according to the fifth embodiment.

FIG. 18 is a time chart for convenient explanation of the operation during shutter release and photography. When a release signal is input and the aperture adjustment is completed, the gain setting (the first gain setting) for the flash photometric section 122 is performed. The way in which the gain is calculated will be explained hereinafter in detail. After this, and after two preparatory emissions of chopped light emission have been performed in order to warm up the flash emission section 136 and the flash photometric section 122, the preliminary light emission is started when the signal at the IS terminal drops, simultaneously with the start of integration (preliminary light emission integration).

After the photometric integrated value has attained a suitable level, or the number of episodes of chopped light emission has reached a predetermined value, the preliminary light emission is terminated, and, after the reading out (the first read out) of the integrated value has been performed, the integrated value is reset when the signal at the IS terminal rises. Since a component of ambient light, as well as the flash light, is included in the integrated value during preliminary light emission, therefore, after this preliminary light emission is concluded, integration is performed for this ambient light only, and, as a post-calculation procedure, the calculation is performed of subtracting the ambient light component from the integrated preliminary light emission value.

As for the second gain setting, gain setting for ambient light integration is performed, and thereafter in the same manner as during the preliminary light emission the voltage level at the IS terminal drops and the integration (ambient light integration) is performed. The gain setting and the integration time period for ambient light integration will be explained hereinafter. After the ambient light integration has been completed and the integrated value has been read out (the second read out), the voltage level at the IS terminal rises and the integrated value is reset. After this the main light emission amount is calculated according to an algorithm which will be described hereinafter, the value thereof is transmitted to the flash microcomputer 135, communication is established with the flash emission section 136, and main light emission control is performed simultaneously with photography; and then photography is concluded.

Figure 19:
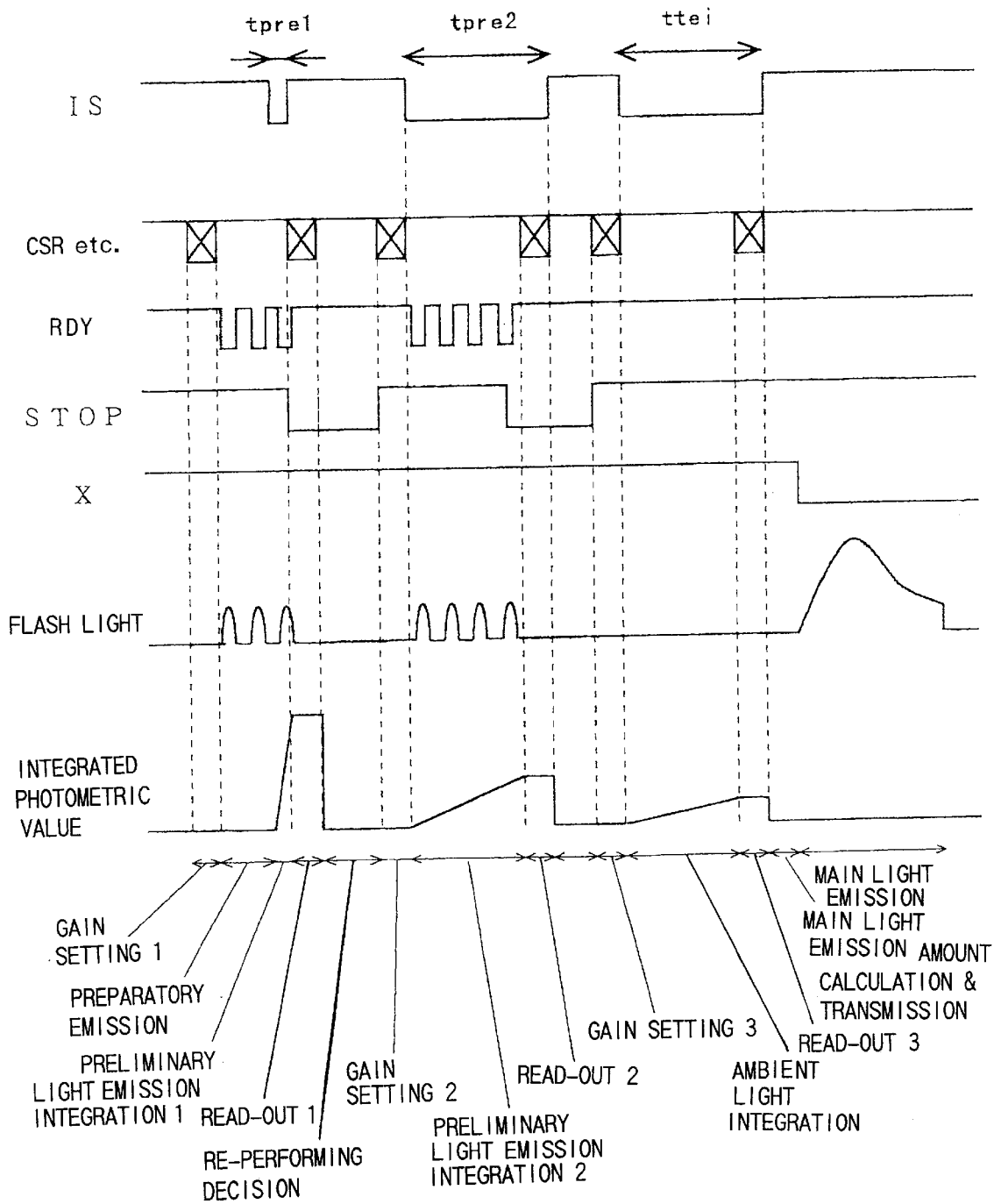
FIG. 19 is a figure easily showing an emission operation of the flash control device according to the fifth embodiment.

FIG. 19 is a time chart showing the signal values during the performance of a second episode of preliminary light emission. As compared with FIG. 18, the portion which is different is that after the first preliminary light emission, the second episode of preliminary light emission is performed with changed gain setting. The way in which the gain during this second episode of preliminary light emission is set will be explained hereinafter.

FIGS. 20 through 24 are graphs for convenient explanation of relationships between various parameters for setting the gain of the flash photometric section 122 and gains. The gains for the regions S1 through S5 of FIG. 14 are set individually and separately, based upon equation (2) below.

$$GaV[i]=SvV+GnV+XmV+AvV+BvV[i]+BoV+ReV-Sa[i], \quad i=1\ldots 5 \quad (2)$$

where the units of Gav[i] are exposure value EV, and the numerical value of i corresponds to the index of the region S. Further, the greater is the value of Gav[i], the higher the gain is set. Each of the items on the right hand side of equation (2) which contributes to the gain will now be explained.

Figure 20:
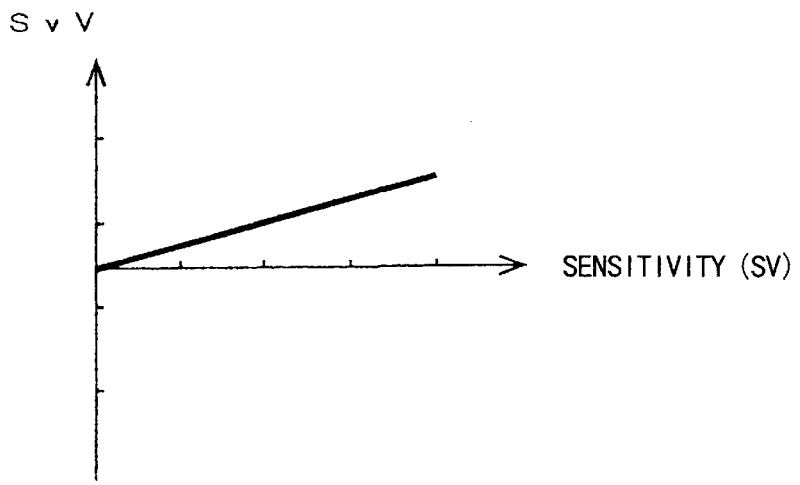
FIG. 20 is a graph which summarizes the relationship between conditions and gains in the flash control device according to the fifth embodiment.
Figure 21:
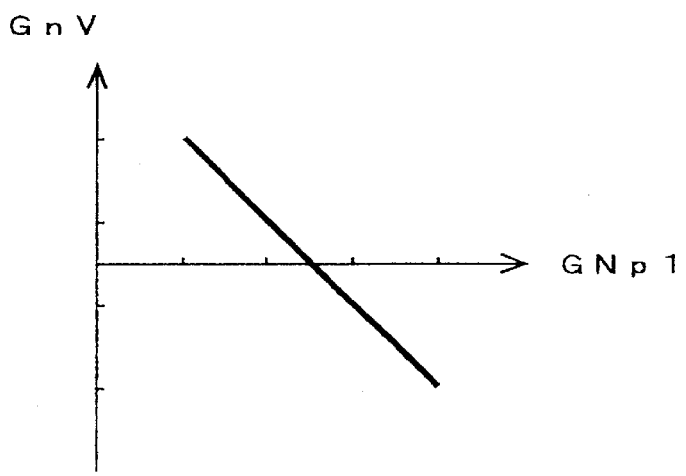
FIG. 21 is a graph which summarizes the relationship between conditions and gains in the flash control device according to the fifth embodiment.

SvV is the contribution to the gain due to the sensitivity (SV) of the image-capturing element 112. As shown in FIG. 20, as this sensitivity (SV) increases SvV also increases, and the gain likewise increases. This is because, as the sensitivity increases, the distance which can provide a proper exposure becomes greater, as a result, the preliminary light emission photometry should also correspond to a greater distance.

However the value of SvV is adjusted so as not to be greater than 1 for a change of sensitivity of 1 EV, in order not to increase the gain too much, since it can also happen that photography is being performed at a close distance even though the sensitivity is high.

GnV is the contribution to the gain due to the emission amount (GNp1) during an episode of preliminary light emission.

This is done in order to be able to obtain a constant photometric value, whatever be the state of the flash unit, by absorbing the amount of change thereof, since Gnp1 changes according to the flash unit which is fitted and according to the angle of emission of the flash light.

Figure 22:
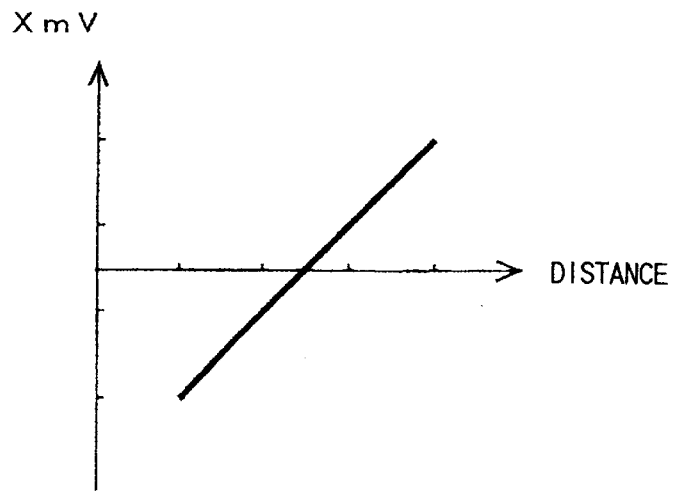
FIG. 22 is a graph which summarizes the relationship between conditions and the distance where the flash light reaches in the flash control device according to the fifth embodiment.

XmV is the contribution to the gain due to the distance. This is done in order to be able to obtain a constant photometric value, whatever the distance may be. Due to this, as shown in FIG. 22, it is arranged so that, when the distance becomes 1 EV farther (the square root of 2 times of the distance), XmV also increases by 1 EV.

Figure 23:
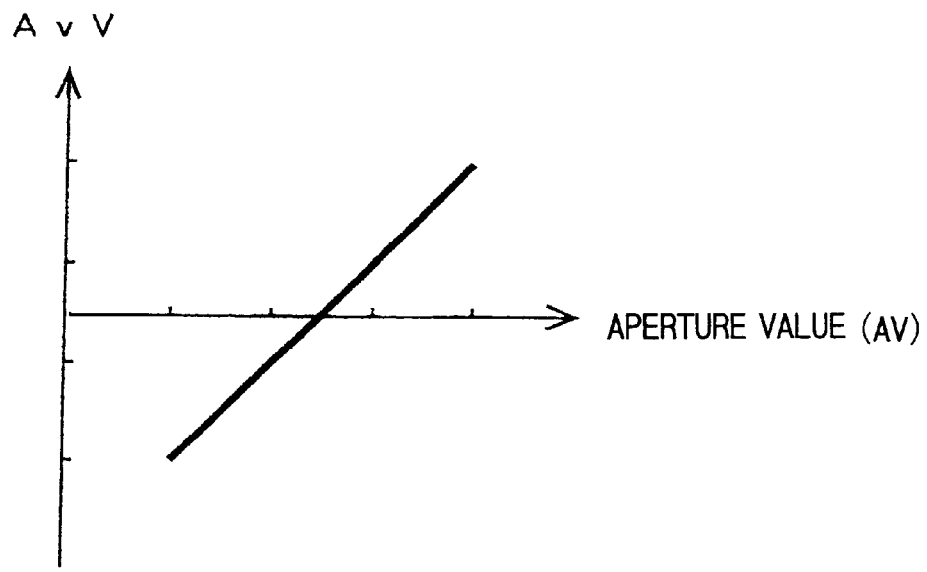
FIG. 23 is a graph which summarizes the relationship between conditions and gains in the flash control device according to the fifth embodiment.

AvV is the contribution to the gain due to the aperture opening value. This is done in order to be able to obtain a constant photometric value, whatever the aperture opening value may be. Due to this, as shown in FIG. 23, it is arranged so that, when the aperture opening value becomes 1 EV greater (i.e., becomes darker), AvV also increases by 1 EV.

Figure 24:
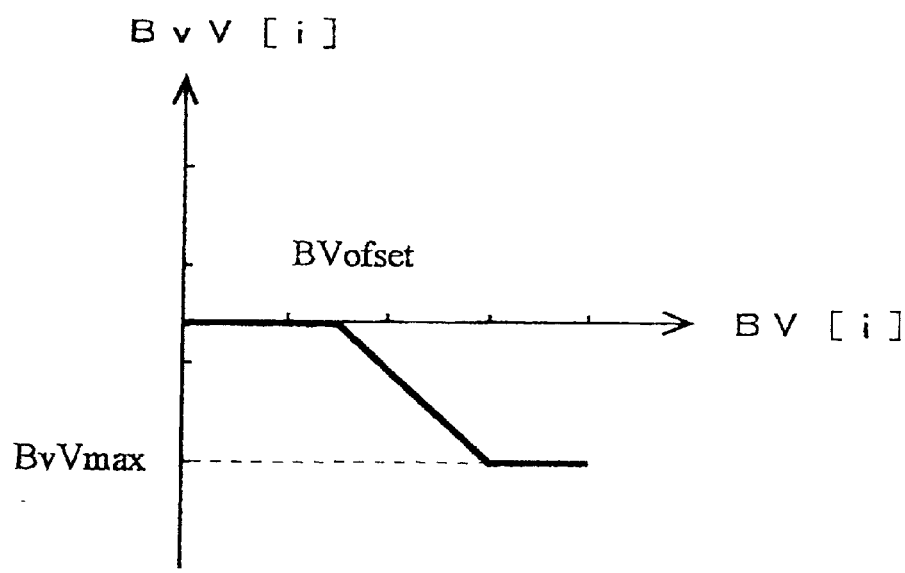
FIG. 24 is a graph which summarizes the relationship between conditions and the distance where the flash light reaches in the flash control device according to the fifth embodiment.

BvV[i] is the contribution to the gain due to the light intensity value. When the ambient light intensity becomes great, this ambient light undesirably enters into the flash photometric section 122 during the preliminary light emission as well, and it can happen that the stop signal is issued before the integrated value of the flash reflected light has sufficiently accumulated, so that the integration is terminated prematurely. Due to this, if the ambient light intensity is high, the gain of the current region is reduced according to this ambient light intensity. As shown in FIG. 24, if the ambient light intensity exceeds Bvofset, then thereafter the gain is reduced by 1 EV each time the ambient light intensity increases by 1 EV, until the amount of reduction reaches BvVmax, at which point BvV is clipped.

BoV is a value which changes according as to whether or not the flash unit is in the bounce state. It is equal to zero in the normal state when there is no bounce, and is set to 2 EV during the bounce state. Because the amount of reflected light is reduced, since during the bounce state the photographic subject is illuminated via light reflection from the ceiling or the like.

ReV is a value which changes according as to whether or not the second episode of preliminary light emission is being performed. It is set equal to zero for the first episode of preliminary light emission, but, if during the first episode of preliminary light emission the photometric value undesirably becomes saturated, then the value of ReV is set to −3 EV, so that the gain is reduced during the second episode of preliminary light emission.

Sa[i] is a correction value which is calculated according to the type and the aperture setting value of the photographic lens. This correction value is obtained for each area individually. It may be determined by experiment, or by calculation in advance.

Figure 25A:
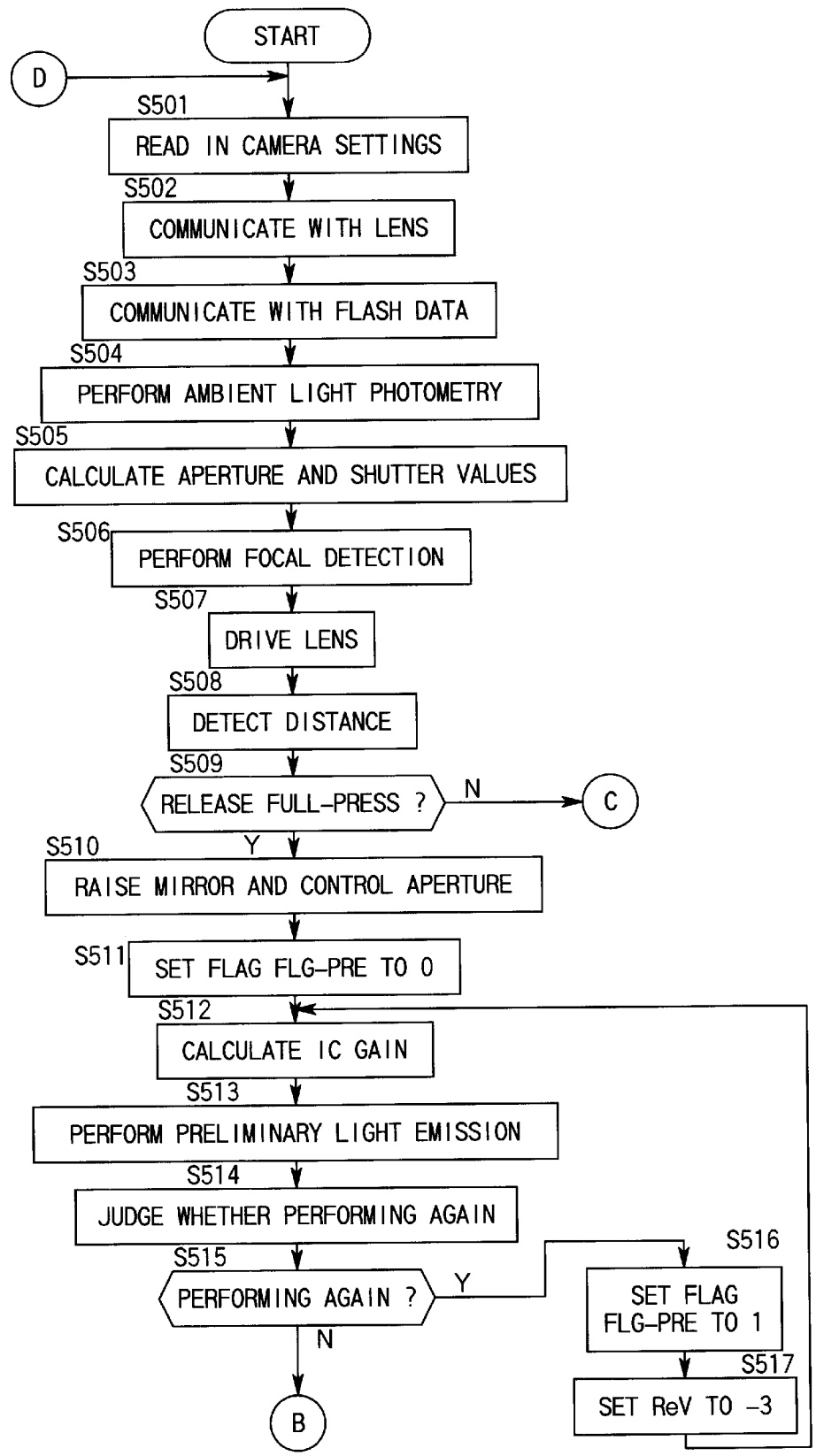
FIGS. 25A and 25B are flow charts for explanation of the operation of the flash control device according to the fifth preferred embodiment.
Figure 25B:
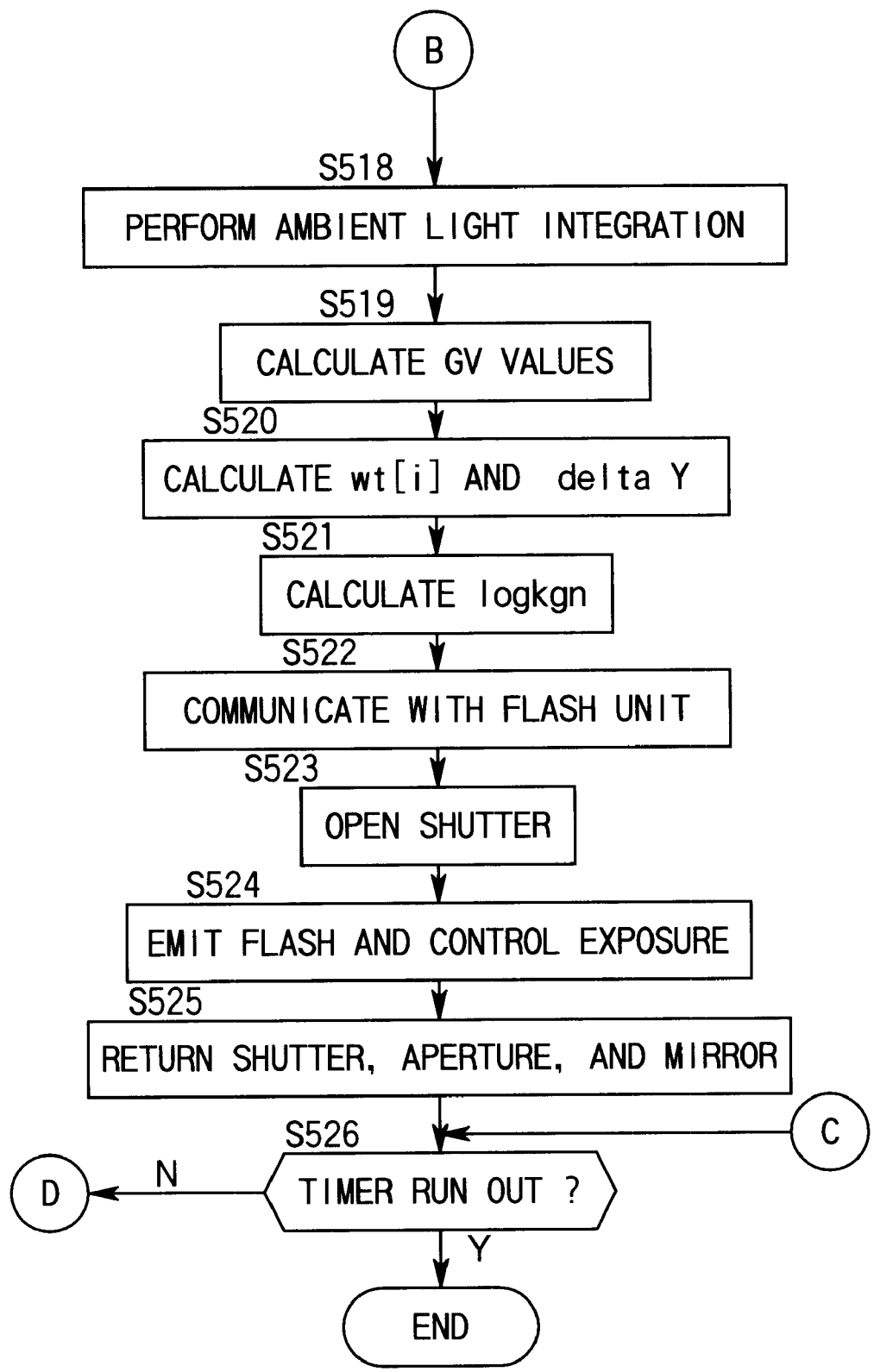

FIGS. 25A and 25B are flow charts showing the operation of a program of the camera microcomputer 130 of the flash control device according to the fifth embodiment. The power source of the camera is turned on and the execution of this program is started by the release switch 126 of the camera being half-pressed. In the following, each program step will be explained in sequence.

In a step S501 various settings of the camera (the sensitivity, the photometric mode, the exposure mode, and the like) are read in.

In a step S502 the focal distance, the open aperture F value, the exit pupil distance, the distance data, and the like of the photographic lens are read out by communication with the lens.

In a step S503 the emission amount (GNp1) for a single episode of preliminary light emission and the flash unit state (presence or absence of the bounce state) and the like are read out by communication with the flash unit.

In a step S504 ambient light photometry is performed and the photometric values B1 through B5 and the like are calculated.

In a step S505 a proper exposure value Bvans is calculated by a per se known method, based upon the photometric value.

In a step S506 focal detection is performed.

In a step S507 the lens is driven according to the focal detection condition until the defocus amount becomes zero, and thereby the camera is focused.

In a step S508 the focal distance of the photographic lens in its focused position is taken as the distance of the photographic subject, and its value is read out from the lens microcomputer 133.

In a step S509 it is decided whether or not the shutter release has been full-pressed, and in the case of a YES decision control proceeds to a step S510, while in the case of a NO decision control jumps to a step S526.

In a step S510 the mirror is raised and the lens aperture is set.

In a step S511 a flag FLG_PRE which denotes re-performing of preliminary light emission is set to 0.

In a step S512 the IC gain of the flash photometric section 122 is calculated based upon equation (2).

In a step S513 preliminary light emission is performed. The details will be described hereinafter.

In a step S514 calculations are performed from the photometric value of the flash photometric section 122 for determining whether or not to re-perform an episode of preliminary light emission. In this re-performing decision, re-performing is decided upon, if the chopped light emission number has stopped at one (not counting the preparatory emission), and moreover, if even one of the integrated values IGpre[i] has attained a previously memorized saturation level.

In a step S515 the re-performing decision is performed, and in the case of a YES decision control proceeds to a step S516, while in the case of a NO decision control jumps to a step S518.

In a step S516 the flag FLG_PRE which denotes re-performing of preliminary light emission is set to 1.

In a step S517 a re-performing gain value ReV is set to −3.

In a step S518 ambient light integration is performed, and the integrated values IGtei[1] through IGtei[5] are read out. For this ambient light integration, the gain setting and the integration time period are set the same as in the case of the preliminary light emission. In other words, in FIG. 18, tpre is set equal to ttei.

In a step S519 GV[1] through GV[5] for each light adjustment region S1 through S5 are calculated from the integrated values obtained by preliminary light emission etc. GV[i] (i=1 . . . 5) are variables related to the reflection ratios of the photographic'subject for each region, expressed in EV units. GV[i] are obtained by the following equation (3).

$$GV[i] = \log 2(GNp1) + \log 2(Qpre) + GaV[i] + \log 2(IGstop/IG[i]) + Gofset \qquad (3)$$

Here, "log 2" means the logarithm to the base 2. IGstop is the theoretical value of IG[i] when the stop signal is output. IG[i]=IGpre[i]−IGtei[i] for IG[i]>0.

In a step S520 the weight wt[i] and a level correction value delyaY for each region are calculated based upon the results for the GV[i] etc., according to a procedure which will be explained hereinafter.

In a step S521 a main light emission amount indication value logkdn for photography is calculated according to the following equation (4).

$$\log kgn = delyaY - \log 2(GNp1) - \log 2(Qpre) - \log 2(\Sigma(wt[i]/2\char`\^GV[i])) + C \quad (4)$$

In this equation, log kgn is a variable which indicates what multiple of the preliminary emission amount (taken as a reference) the main light emission amount is, and the value for this multiple is compressed by taking its logarithm to the base 2. Thus "log 2" means the logarithm to the base 2, and C is an offset value. "2^GV[i]" means 2 raised to the power GV[i].

In a step S522 the main light emission amount indication value log kgn and the number stn of invalid light pre-emissions are transmitted by communication to the flash microcomputer 135.

The number stn of invalid light pre-emissions is, if no preliminary light emission has been re-performed, the number of preparatory emissions (two); or, if preliminary light emission has been re-performed, the sum of the number of preparatory emissions and the number of the first preliminary light emissions (one).

In a step S523 the shutter is opened. In a step S524 the flash emission section 136 performs emission amount control of the main light emission, and exposure upon the image-capturing element 112 is performed.

In a step S525 the shutter, the aperture, and the mirror are returned to their initial positions.

In a step S526, after starting a half-press timer, a decision is made as to whether or not a predetermined time period has elapsed, and if this period has not yet elapsed then control is returned to the step S501 and the procedure is repeated, while if the timer has timed out then this procedure is terminated.

Figure 26:
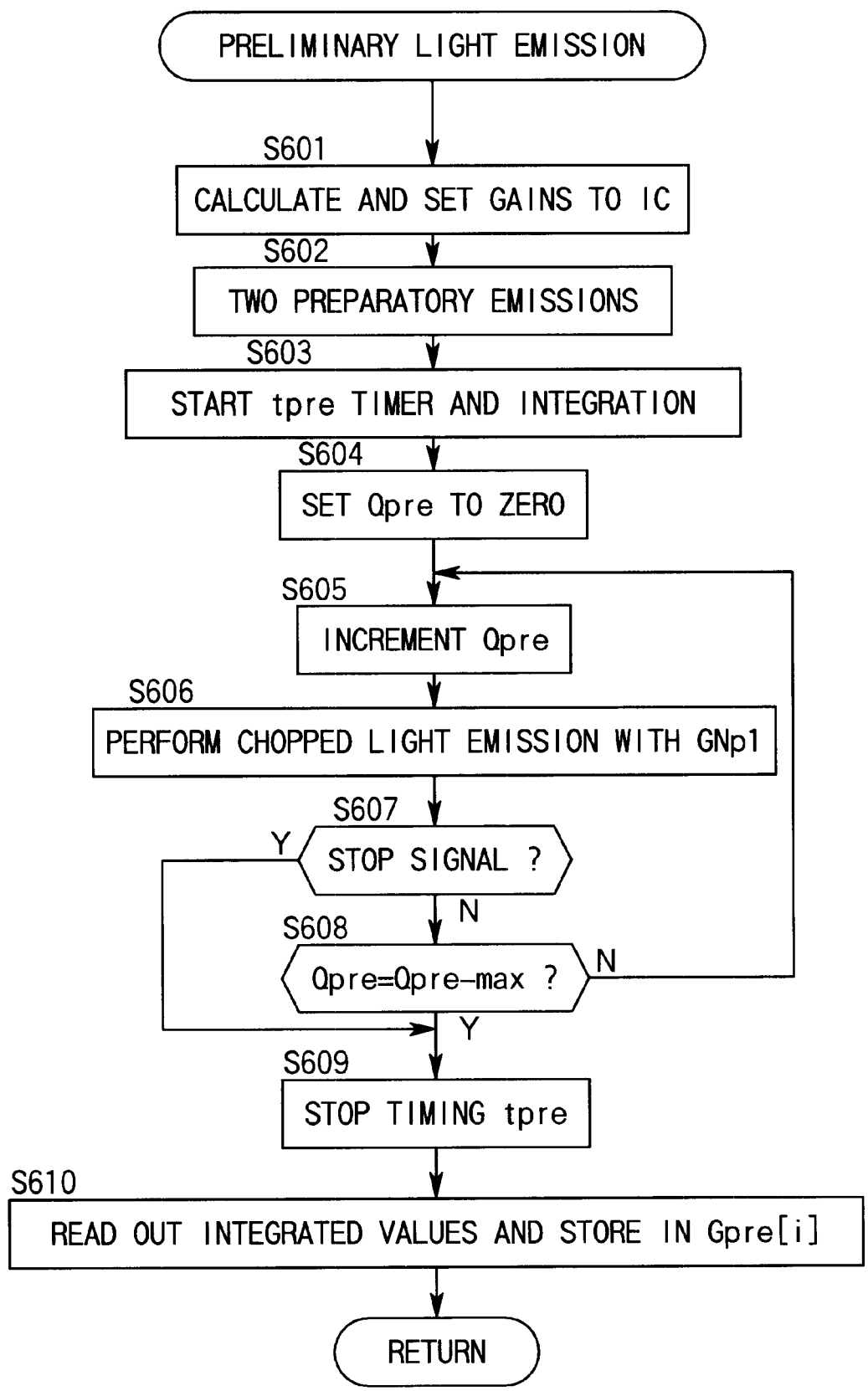
FIG. 26 is another flow chart for explanation of the operation of the flash control device according to the fifth preferred embodiment.

FIG. 26 is a flow chart showing the method of preliminary light emission by the flash control device according to this embodiment. In a step S601 the gains DApre[i] which are to be actually set to the light adjustment element 115 are calculated according to the following equation (5).

$$DApre[i] = (pre\_level[i] - GaV[i] * pre\_gamma) * T/Tref (i=1\sim 5) \quad (5)$$

Here, pre_level[i] are reference values for the preliminary light emission light adjustment level, pre_gamma is a gamma adjustment value, T is the current temperature, and Tref is the temperature during adjustment. Further, the reason for the minus sign affixed to "−GaV[i]" is that, in the characteristics of the light adjustment element 115 shown in FIG. 15, the gain is increased when the voltage at the DA terminal is lowered.

In a step S602 two preparatory emissions are performed.

In a step S603 the measurement of time by tpre is started. Integration is started by putting IS=L.

In a step S604 the variable Qpre which represents the number of light pre-emissions is set to zero.

In a step S605 Qpre is incremented by 1.

In a step S606 chopped light emission is performed in the emission amount GNp1.

In a step S607 a decision is made as to whether or not a stop signal has been issued, and if the result of this decision is YES then control jumps to the step S609, while if the result of this decision is NO then control proceeds to the step S608.

In the step S608 a decision is made as to whether or not the number of light pre-emissions has yet reached Qpremax, and if the result of this decision is YES then control proceeds to the step S609, while if the result of this decision is NO then control returns to the step S605.

In the step S609 the timing of tpre is terminated.

In a step S610 the integrated values IGpre [i] are read out, and then, after storing them in IGpre[i], the flow of control returns.

Next, the method of calculating wt [i] and deltaY in the step S520 of the FIG. 25B flow chart will be explained. First, the photographic subject reflection ratio RefEV[i] for each region is calculated according to equation (6), using the GV[i] for each region obtained according to equation (3).

$$RefEV[i] = 2*X + AV - GV[i] (i=1 \ldots 5) \quad (6)$$

Here, X is the photographic distance (units meters), and AV is the aperture value for photography (units AV). Moreover, RefEV[i] is a value equal to zero if the reflection ratio has the standard value, equal to +1 if the reflection ratio is one step higher than the standard value, and equal to −1 if the reflection ratio is one step lower than the standard value.

Next, using RefEV[i], the weighted number RefG[i] for each region corresponding to the reflection ratio is calculated according to equation (7).

$$RefG[i] = 1/(2\char`\^(Abs(RefG[i])))(i=1 \ldots 5) \quad (7)$$

Figure 28:
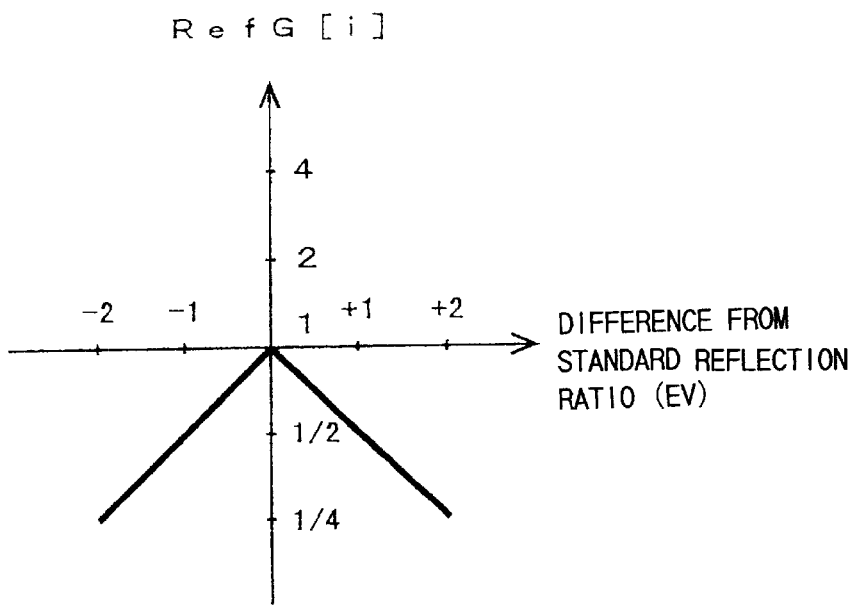
FIG. 28 is a graph which summarizes the relationship between reflection ratio and a variable.

Here the function Abs ( ) is the absolute value function to obtain the absolute value of the value within ( ). As shown in FIG. 28, RefG[i] is a variable which is 1 if the reflection ratio of the photographic subject is the standard value, and which becomes smaller the further this reflection ratio departs from the standard value.

Next RefG[i] is standardized using equation (8), and the weight wt[i] for each region is calculated.

$$wt[i] = RefG[i]/\Sigma(RefG[i])(i=1 \ldots 5) \quad (8)$$

Here the function Σ ( ) represents summation of variables RefG[i] within ( ) over the values 1 through 5 for i.

Next, using the RefEV[i] obtained by equation (6) again, a reflection ratio correction value RefMain for the entire photographic field is calculated according to equation (9).

$$RefMain = \log 2 (\Sigma(wt[i]*2\char`\^RefEV[i]))(i=1 \ldots 5) \quad (9)$$

Here the function Σ ( ) is the same as in equation (8), and "log 2" means the logarithm to the base 2.

Next, using RefMain, the main light emission amount correction value deltaY is calculated according to equation (10).

$$deltaY = krm*RefMain \quad (10)$$

Figure 29:
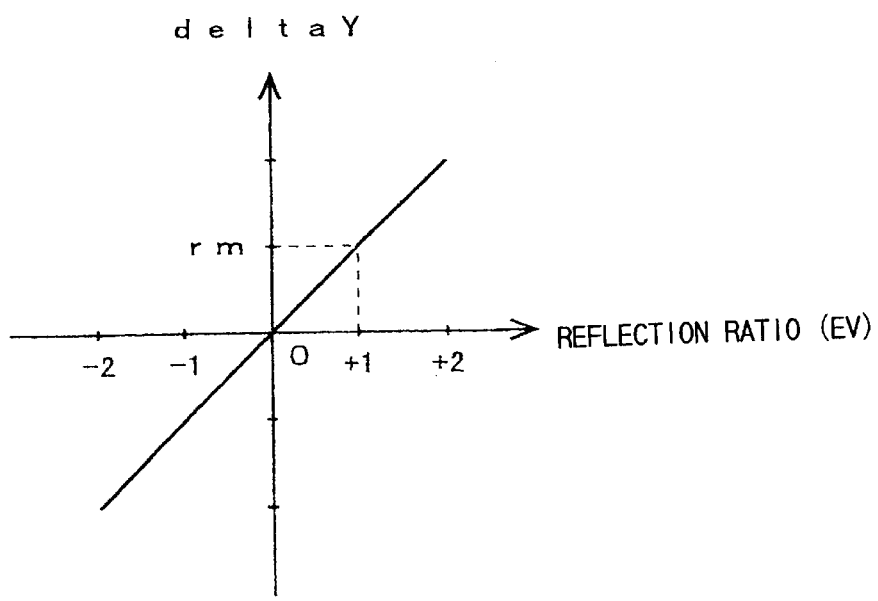
FIG. 29 is a graph which summarizes the relationship between reflection ratio and another variable.

The relationship between the reflection ratio and deltaY is shown in FIG. 29. Here, krm is a constant for adjusting the correction level for the reflection ratio, and a numerical value for krm of about 0.5 may be used, but this may be altered according to requirements.

Figure 27:
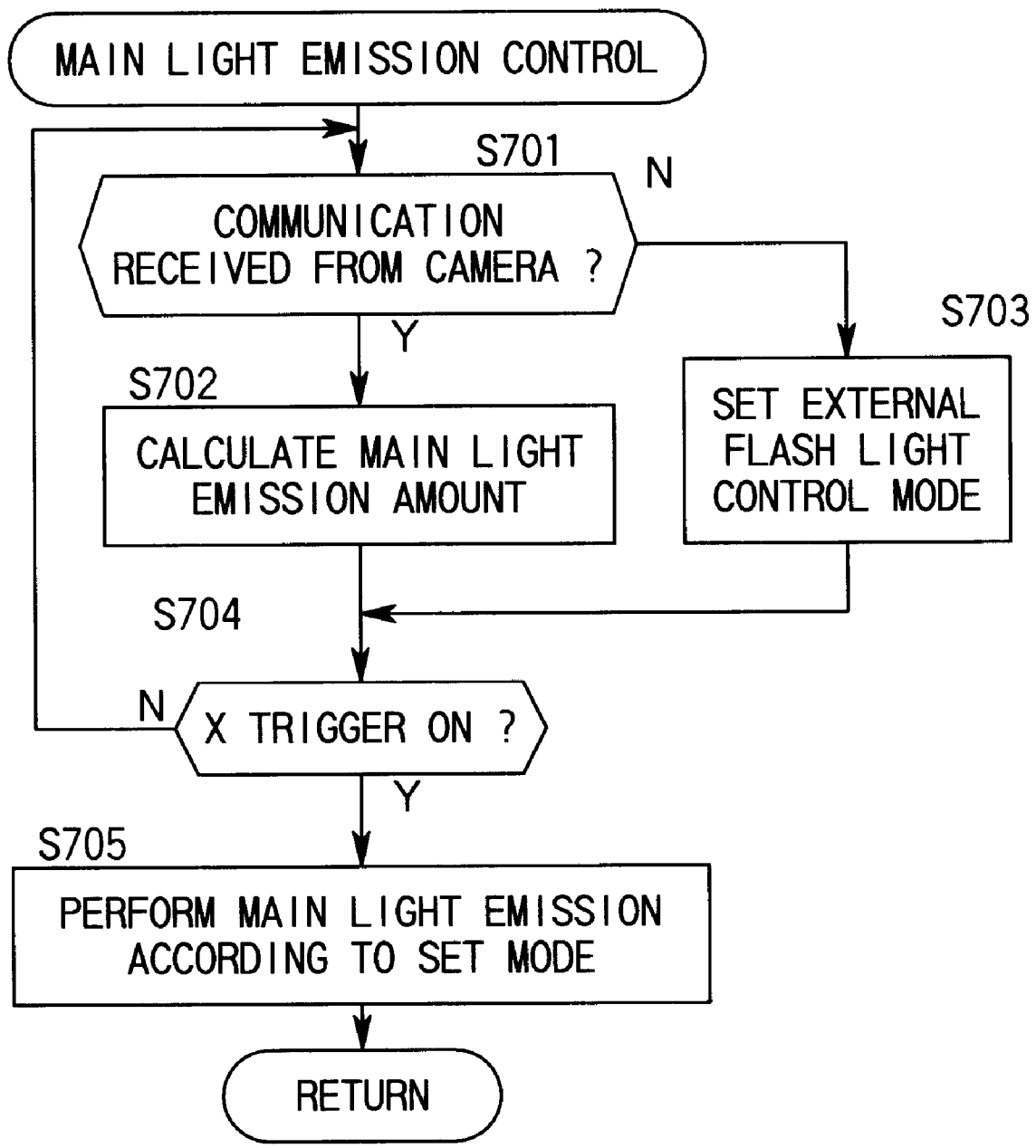
FIG. 27 is a further flow chart for explanation of the operation of the flash control device according to the fifth preferred embodiment.

FIG. 27 is a flow chart for explanation of the main light emission operation of the flash control device according to this embodiment.

In a step S701 a decision is made as to whether or not the values log kgn and stn for calculating the main light emission amount have been transmitted, and if the result of this decision is YES then control proceeds to a step S702, while if the result of this decision is NO then control is transferred to a step S703.

In the step S702 the main light emission amount is calculated as follows. In the flash unit main body 153, the light emission monitor section 137 performs photometry directly on the emission light from the flash emission section 136 at performing of preliminary light emission. The flash microcomputer 135 stores the light emission amount accumulating each light emission amount which is measured directly by the light emission monitor 137 at each preliminary light emission. Consequently when the flash microcomputer 135 receives the value of stn, the flash microcomputer performs subtracting the accumulated light emission amount at stn-th emission from the accumulated light emission amount at the completion of preliminary light emission, and obtains the preliminary light emission amount for calculation of the main light emission in the flash unit. The main light emission amount is obtained by multiplying this value by the main light emission amount indication value log kgn that has been converted to antilogarithm.

In the step S703, if the transmitted data does not come, the external flash light control mode is set. The external flash light control mode is a mode in which light reflected back from the photographic subject is detected by a sensor (not shown in the figures) provided within the flash unit main body 153, and light emission is terminated when the amount of the reflected light reaches a predetermined value. In other words, this mode is a mode in which photometry with TTL is not performed on preliminary light emission, but light emission is controlled by only the sensor provided within the flash unit 153.

In a step S704 a decision is made as to whether or not a light emission trigger (X signal) has arrived, and if the result of this decision is YES then control proceeds to a step S705, while if the result of this decision is NO then control returns to the step S701.

In the step S705 main light emission control is performed according to the mode which is set.

Thus, even if the image-capturing element 112 such as CCD in which flash light is not reflected with diffusion and therefore TTL flash control can not be performed at main light emission is used, flash light emission amount can be controlled suitably. In other words, the TTL photometry is performed at preliminary light emission, and at main light emission, the data of preliminary light emission (log kgn and stn) obtained in the camera where TTL photometry was performed and the absolute photometry amount of preliminary light emission that was obtained by direct photometry in the flash unit are used to calculate the exact main light emission amount, and then the suitable main light emission control is performed.

The present invention is not limited to the embodiments described above; various modifications and alterations can be made without departing from the scope of the invention. For example:

(1) Although by way of example the above explanation has been presented in terms of an electronic still camera using an image-capturing element such as a CCD or the like, the present invention can also be applied to a camera in which a silver halide film is exposed.

(2) Although by way of example the above explanation referred to an externally fitted flash unit, the present invention can also be applied to an internal flash unit. Although by way of example the flash unit has a flash tube, the present invention can also be applied to a flash unit that has multiple flash tubes.

(3) In the case of small light emission which includes the case of FP light emission, since the period of light emission repetition is short, it would also be acceptable to specify a time period to cut off a few seconds after its start with regard to the number of episodes of repetition of small light emission.

(4) Although in the above explanation by way of example the episodes of low light emission which were taken as invalid were specified as a predetermined number starting from the first, as an alternative it would also be possible to specify as invalid the group of emissions between any two particular ones. Further, it would also be possible to specify as invalid all the episodes of small light emission except the last one.

Yet further, although by way of example in the above explanation the specification of episodes of small light emission as invalid was described, as an alternative it would also be possible to specify a number to be valid "how many to be used from some certain light emission episode".

What is claimed is:

1. A flash control device, comprising:

a flash emission section that performs main light emission at photography and preliminary light emission before photography;

a flash photometric section that divides a photographic field into a plurality of photometric areas and performs photometry of reflected light from a photographic subject due to said preliminary light emission; and a flash control section that performs control by, if an output from at least one photometric area of said plurality of photometric areas is outside a predetermined range, resetting a gain related to photometry for said at least one photometric area, and performing again a preliminary light emission by said flash emission section and a preliminary light emission photometry by said flash photometric section.

2. A flash control device, comprising:

a flash emission section that performs main light emission at photography and preliminary light emission before photography;

a flash photometric section that divides a photographic field into a plurality of photometric areas and performs photometry of reflected light from a photographic subject due to said preliminary light emission; and a flash control section that performs control by, if an output from at least one photometric area of said plurality of photometric areas is outside a predetermined range, replacing the output from said at least one photometric area by a predetermined value that is set in advance.

3. A flash control device, comprising:

a flash emission section that performs main light emission at photography and preliminary light emission before photography;

a flash photometric section that divides a photographic field into a plurality of photometric areas and performs photometry of reflected light from a photographic subject due to said preliminary light emission;

a main light emission amount calculation section that performs calculation for controlling said main light emission based upon an output of said flash photometric section; and a flash control section that performs control by, if the output from at least one photometric area of said plurality of photometric areas is outside a predetermined range, ensuring that said output from at least one photometric area is not used for calculation by said main light emission amount calculation section.

4. A flash control device, comprising:

a flash emission section that performs main light emission at photography and preliminary light emission before photography;

a flash photometric section that divides a photographic field into a plurality of photometric areas and performs photometry of reflected light from a photographic subject due to said preliminary light emission;

a valid area determination section that determines one or more photometric areas to be used for main light emission control based upon an output of said flash photometric section; and a flash control section that performs control by, if outputs from the photometric areas of said flash photometric section that have been determined as valid by said valid area determination section are outside predetermined ranges, performing again a preliminary light emission by said flash emission section and a preliminary light emission photometry by said flash photometric section.

5. A flash control device, comprising:

an ambient light photometric section that divides a photographic field into a plurality of ambient light photometric areas and performs photometry of light intensity of the photographic field due to ambient light;

a flash emission section that performs main light emission at photography and preliminary light emission before photography;

a flash photometric section that divides a photographic field into a plurality of photometric areas and performs photometry of reflected light from a photographic subject due to said preliminary light emission; and a flash control section that performs control by setting a gain of a flash photometric area of said flash photometric section that corresponds to at least one ambient light photometric area based upon a measured ambient light intensity of said at least one ambient light photometric area of said ambient light photometric section, and then by performing preliminary light emission photometry.

6. A flash control device according to claim 5, wherein said flash control section sets the gain of said flash photometric area of said flash photometric section that corresponds to said at least one ambient light photometric area small when the measured ambient light intensity in said at least one ambient light photometric area is great.

7. A flash control device, comprising:

a flash emission section that performs preliminary light emission and main light emission;

a flash control section that controls said flash emission section to perform said preliminary light emission and said main light emission;

a flash photometric section that performs photometry upon light reflected from a photographic subject during said preliminary light emission;

an indication value calculation section that calculates a main light emission amount indication value for calculating a main light emission amount in said flash emission section, based upon an output of said flash photometric section; and a specified information setting section that sets specified information related to a reference emission amount for calculating said main light emission amount in said flash emission section.

8. A flash control device according to claim 7, wherein said flash emission section repeats a small light emission of a predetermined emission amount during preliminary light emission.

9. A flash control device according to claim 8, wherein said specified information setting section, as the specified information related to said reference emission amount, sets a number of invalid small light emissions among small light emissions performed during said preliminary light emission.

10. A flash control device according to claim 9, wherein said specified information setting section sets as invalid a first through a predetermined number of small light emission among small light emissions performed during said preliminary light emission.

11. A flash control device according to claim 7, wherein said flash control section causes said flash emission section to perform again preliminary light emission when said flash photometric section has failed in preliminary light emission photometry.

12. A flash control device according to claim 11, wherein said specified information setting section, if preliminary light emission has been performed again, sets small light emissions from a first to end of the first preliminary light emission as invalid.

13. A flash control device according to claim 7, wherein said specified information setting section sets information showing invalid emission amount during preliminary light emission and information to relate valid preliminary emission amount and main light emission amount.

14. A flash control device according to claim 7, wherein:

said flash emission section is attached to an outside of a main body of the device;

a transmission section that transmits said indication value calculated by said indication value calculation section and said specified information set by said specified information setting section to said flash emission section, is further provided; and said flash emission section performs a different type of light emission control that is specified in advance, if said transmission section has failed to transmit information.

15. A flash control device according to claim 7, wherein said flash emission section performs a different type of light emission control that is specified in advance, when no information has come from said transmission section during a predetermined time period from after an end of preliminary light emission, or when a command arrives for a start of main light emission before information has come from said transmission section.

16. A flash control device according to claim 14, wherein said flash emission section performs control according to an external flash light control method, if the main light emission amount cannot be calculated.

17. A flash control device according to claim 15, wherein said flash emission section performs control according to an external flash light control method, if the main light emission amount cannot be calculated.

18. A flash control device according to claim 7, wherein said flash photometric section performs TTL flash control.

19. A flash control device according to claim 7, wherein said flash control device is used in an electronic still camera that employs an image-capturing element.

20. A flash control device, comprising:

a flash emission section that performs preliminary light emission and main light emission;

a first flash photometric section that performs photometry upon light reflected from a photographic subject through a photographic lens of a camera during preliminary light emission;

a second flash photometric section that performs photometry directly upon light from said flash emission section during preliminary light emission and during main light emission;

a preliminary light emission control section that performs control of preliminary light emission based upon an output of said first flash photometric section;

an invalid light emission information generation section that detects invalid light emission during preliminary light emission, and generates information related to said invalid light emission;

a main light emission amount indication value calculation section that calculates a main light emission amount indication value for calculating a main light emission amount in said flash emission section, based upon an output of said first flash photometric section obtained excluding said invalid light emission during preliminary light emission; and a main light emission control section that calculates a main light emission amount based upon said main light emission amount indication value, said information related to invalid light emission, and an output of said second flash photometric section obtained during preliminary light emission, and that performs control of main light emission based upon said calculated main light emission amount and an output of said second flash photometric section.

21. A flash control device in a camera, comprising:

a flash direction section that directs a flash device connected to the camera to perform preliminary light emission and main light emission;

a flash photometric section that performs photometry upon light reflected from a photographic subject through a photographic lens of the camera during preliminary light emission;

a preliminary light emission control section that performs control of preliminary light emission based upon an output of said flash photometric section;

an invalid light emission information generation section that detects invalid light emission during preliminary light emission, and generates information related to said invalid light emission;

a indication value calculation section that calculates a main light emission amount indication value for calculating a main light emission amount in the flash device, based upon an output of said flash photometric section obtained excluding said invalid light emission during preliminary light emission; and a main light emission information output section that outputs said main light emission amount indication value and said information related to invalid light emission to the flash device, in order that a main light emission amount can be calculated in the flash device based upon said main light emission amount indication value, said information related to invalid light emission, and an absolute preliminary light emission amount that was obtained through photometry directly upon light from a flash emission section in the flash device during preliminary light emission.

22. A flash device connected to a camera, comprising:

a flash emission section that performs preliminary light emission and main light emission based upon a direction from the camera;

a flash photometric section that performs photometry directly upon light from said flash emission section during preliminary light emission and during main light emission;

a main light emission information input section that inputs, from the camera, information related to invalid light emission during preliminary light emission and a main light emission amount indication value that is calculated based on photometry upon light reflected from a photographic subject through a photographic lens of the camera excluding said invalid light emission during preliminary light emission;

a main light emission amount calculation section that calculates a main light emission amount based upon said main light emission amount indication value input by said main light emission information input section, said information related to invalid light emission input by said main light emission information input section, and an absolute preliminary light emission amount that was obtained through photometry by said flash photometric section flash during preliminary light emission; and a main light emission control section that controls a main light emission based upon the main light emission amount calculated by said main light emission amount calculation section and an output of said flash photometric section.

* * * * *